(12) United States Patent
Usoro et al.

(10) Patent No.: US 6,530,858 B1
(45) Date of Patent: Mar. 11, 2003

(54) FAMILY OF MULTI-SPEED PLANETARY POWER TRANSMISSION MECHANISMS HAVING THREE PLANETARY GEARSETS

(75) Inventors: Patrick Benedict Usoro, Troy, MI (US); Chi-Kuan Kao, Troy, MI (US); Madhusudan Raghavan, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/956,518

(22) Filed: Sep. 19, 2001

(51) Int. Cl.$^7$ ................................................. F16H 3/62
(52) U.S. Cl. ..................... 475/296; 475/311; 475/317; 475/323
(58) Field of Search ................................. 475/269, 296, 475/314, 320, 326, 311, 317, 323

(56) References Cited

U.S. PATENT DOCUMENTS

| | | | |
|---|---|---|---|
| 3,929,037 A | * 12/1975 | Marsch | 475/218 |
| 4,070,927 A | 1/1978 | Polak | |
| 5,106,352 A | 4/1992 | Lepelletier | 475/280 |
| 5,315,898 A | * 5/1994 | Koyama et al. | 475/330 |
| 5,542,889 A | * 8/1996 | Pierce et al. | 475/275 |
| 5,599,251 A | 2/1997 | Beim et al. | 475/275 |
| 6,071,208 A | 6/2000 | Koivunen | 475/275 |
| 6,425,841 B1 | * 7/2002 | Haka | 475/275 |

FOREIGN PATENT DOCUMENTS

JP  90126283  5/1997

* cited by examiner

Primary Examiner—Sherry Estremsky
(74) Attorney, Agent, or Firm—Kathryn A. Marra

(57) ABSTRACT

A family of power transmissions, which are utilized in a powertrain, include three planetary gearsets and five torque-transmitting mechanisms. The torque-transmitting mechanisms are either five rotating type torque-transmitting mechanisms or four rotating type torque-transmitting mechanisms and one stationary type torque-transmitting mechanism. Each of the three planetary gearsets all include three members represented by a sun gear member, a ring gear member, and planet carrier assembly member. The planet carrier assembly member may be of either the single pinion or double pinion. In each of the family members, at least four of the planetary members are interconnected continuously with either another planetary member, the input shaft, the output shaft, or a stationary housing of the transmission. At least four of the planetary members are noncontinuously interconnected with another planetary member, the input shaft, the output shaft, or the stationary housing. However, these four members are selectively interconnectible with other members through the use of the torque-transmitting mechanisms. In each family member the torque-transmitting mechanisms are engaged in combinations of three to establish at least six forward speed ratios and the one reverse speed ratio between the input shaft and the output shaft.

5 Claims, 13 Drawing Sheets

| | Ratios | 50 | 52 | 54 | 56 | 58 |
|---|---|---|---|---|---|---|
| Reverse | -1.92 | X | X | X | | |
| Neutral | 0.00 | | X | X | | |
| 1 | 3.53 | | X | X | | X |
| 2 | 2.37 | | X | X | X | |
| 3 | 1.67 | | X | | X | X |
| 4 | 1.00 | X | X | | X | |
| 5 | 0.70 | X | | | X | X |
| 6 | 0.51 | X | X | | | X |
| 7 | 0.38 | X | | X | X | |

(X=engaged clutch)

$\frac{\text{Ring Gear}}{\text{Sun Gear}}$ Toothratio : $\frac{R_1}{S_1} = 1.50$, $\frac{R_2}{S_2} = 2.31$, $\frac{R_3}{S_3} = 2.80$

| Ratio Spread | 6.92(1/6) | 9.3(1/7) |
|---|---|---|
| Ratio Steps | | |
| Rev/1 | -0.54 | -0.54 |
| 1/2 | 1.49 | 1.49 |
| 2/3 | 1.42 | 1.42 |
| 3/4 | 1.67 | 1.67 |
| 4/5 | 1.43 | 1.43 |
| 5/6 | 1.37 | 1.37 |
| 6/7 | . | 1.35 |

| | Ratios | 150 | 152 | 154 | 156 | 158 |
|---|---|---|---|---|---|---|
| Reverse | -1.86 | | | X | X | X |
| Neutral | 0.00 | | | | X | X |
| 1 | 3.46 | | X | | X | X |
| 2 | 1.95 | X | | | X | X |
| 3 | 1.33 | X | X | | X | |
| 4 | 1.00 | X | X | | | X |
| 5 | 0.78 | X | | X | | X |
| 6 | 0.62 | X | X | X | | |

(X=engaged clutch)

$\frac{Ring\ Gear}{Sun\ Gear}$ Toothratio : $\frac{R_1}{S_1}=3.00,\ \frac{R_2}{S_2}=1.58,\ \frac{R_3}{S_3}=2.43$

| Ratio Spread | 5.56 |
|---|---|
| Ratio Steps | |
| Rev/1 | -0.54 |
| 1/2 | 1.77 |
| 2/3 | 1.46 |
| 3/4 | 1.33 |
| 4/5 | 1.28 |
| 5/6 | 1.26 |

| | Ratios | 250 | 252 | 254 | 256 | 258 |
|---|---|---|---|---|---|---|
| Reverse | -1.59 | | X | X | | X |
| Neutral | 0.00 | | | | | X |
| 1 | 3.13 | X | | | X | X |
| 2 | 1.85 | X | X | | X | |
| 3 | 1.30 | X | X | | | X |
| 4 | 1.00 | | X | | X | X |
| 5 | 0.69 | | | X | X | X |
| 6 | 0.60 | | X | X | X | |

(X=engaged clutch)

$\dfrac{\text{Ring Gear}}{\text{Sun Gear}}$ Toothratio : $\dfrac{R_1}{S_1}=1.50,\quad \dfrac{R_2}{S_2}=3.00,\quad \dfrac{R_3}{S_3}=2.13$

| Ratio Spread | 5.22 |
|---|---|
| Ratio Steps | |
| Rev/1 | -0.51 |
| 1/2 | 1.69 |
| 2/3 | 1.42 |
| 3/4 | 1.30 |
| 4/5 | 1.45 |
| 5/6 | 1.15 |

|  | Ratios | 350 | 352 | 354 | 356 | 358 |
|---|---|---|---|---|---|---|
| Reverse | -1.83 | X | X |  |  | X |
| Neutral | 0.00 | X | X |  |  |  |
| 1 | 2.61 | X | X |  | X |  |
| 2 | 1.57 | X |  | X | X |  |
| 3 | 1.00 | X | X | X |  |  |
| 4 | 0.75 |  | X | X | X |  |
| 5 | 0.55 |  | X | X |  | X |
| 6 | 0.42 |  |  | X | X | X |

(X=engaged clutch)

$\frac{Ring\ Gear}{Sun\ Gear}$ Toothratio : $\frac{R_1}{S_1}=1.87$, $\frac{R_2}{S_2}=1.83$, $\frac{R_3}{S_3}=1.51$

| Ratio Spread | 6.19 |
|---|---|
| Ratio Steps |  |
| Rev/1 | -0.70 |
| 1/2 | 1.66 |
| 2/3 | 1.57 |
| 3/4 | 1.33 |
| 4/5 | 1.37 |
| 5/6 | 1.30 |

| | Ratios | 450 | 452 | 454 | 456 | 458 |
|---|---|---|---|---|---|---|
| Reverse | -2.78 | | X | | X | X |
| Neutral | 0 | | X | | X | |
| 1 | 3.08 | X | X | | X | |
| 2 | 1.53 | | X | X | X | |
| 3 | 1 | X | X | X | | |
| 4 | 0.76 | | X | X | | X |
| 5 | 0.53 | X | | X | | X |
| 6 | 0.39 | X | X | | | X |

(X=engaged clutch)

$\frac{\text{Ring Gear}}{\text{Sun Gear}}$ Toothratio : $\frac{R_1}{S_1}=1.86$, $\frac{R_2}{S_2}=1.88$, $\frac{R_3}{S_3}=2.89$

| Ratio Spread | 7.7 |
|---|---|
| Ratio Steps | |
| Rev/1 | -0.9 |
| 1/2 | 2 |
| 2/3 | 1.53 |
| 3/4 | 1.3 |
| 4/5 | 1.43 |
| 5/6 | 1.33 |

| | Ratios | 558 | 550 | 552 | 554 | 556 |
|---|---|---|---|---|---|---|
| Reverse | -2.01 | X | X | | X | |
| Neutral | 0.00 | X | | | X | |
| 1 | 3.69 | X | | | X | X |
| 2 | 2.28 | | X | | X | X |
| 3 | 1.53 | | | X | X | X |
| 4 | 1.00 | | X | X | X | |
| 5 | 0.77 | | X | X | | X |
| 6 | 0.55 | X | X | X | | |

(X=engaged clutch)

$\frac{\text{Ring Gear}}{\text{Sun Gear}}$ Toothratio : $\frac{R_1}{S_1}=1.84$, $\frac{R_2}{S_2}=2.01$, $\frac{R_3}{S_3}=2.34$

| Ratio Spread | 6.70 |
|---|---|
| Ratio Steps | |
| Rev/1 | -0.54 |
| 1/2 | 1.62 |
| 2/3 | 1.49 |
| 3/4 | 1.53 |
| 4/5 | 1.31 |
| 5/6 | 1.39 |

| | Ratios | 658 | 650 | 652 | 654 | 656 |
|---|---|---|---|---|---|---|
| Reverse | -1.72 | X | | X | | X |
| Neutral | 0.00 | X | | X | | |
| 1 | 3.32 | X | | X | X | |
| 2 | 2.23 | | | X | X | X |
| 3 | 1.54 | | X | X | X | |
| 4 | 1.00 | | X | X | | X |
| 5 | 0.82 | | X | | X | X |
| 6 | 0.61 | X | X | | | X |

(X=engaged clutch)

$\frac{Ring\ Gear}{Sun\ Gear}$ Toothratio : $\frac{R_1}{S_1}$ =2.81, $\frac{R_2}{S_2}$ =1.58, $\frac{R_3}{S_3}$ =1.87

| Ratio Spread | 5.43 |
|---|---|
| Ratio Steps | |
| Rev/1 | -0.52 |
| 1/2 | 1.49 |
| 2/3 | 1.45 |
| 3/4 | 1.54 |
| 4/5 | 1.22 |
| 5/6 | 1.34 |

| | Ratios | 758 | 750 | 752 | 754 | 756 |
|---|---|---|---|---|---|---|
| Reverse | -1.73 | X | | X | | X |
| Neutral | 0 | X | | | | X |
| 1 | 3.23 | X | X | | | X |
| 2 | 2.2 | | X | X | | X |
| 3 | 1.53 | | X | | X | X |
| 4 | 1 | | | X | X | X |
| 5 | 0.82 | | X | X | X | |
| 6 | 0.61 | X | X | | X | |

(X=engaged clutch)

$\frac{Ring\ Gear}{Sun\ Gear}$ Toothratio : $\frac{R_1}{S_1}=1.58,\ \frac{R_2}{S_2}=2.82,\ \frac{R_3}{S_3}=1.89$

| Ratio Spread | 5.27 |
|---|---|
| Ratio Steps | |
| Rev/1 | -0.53 |
| 1/2 | 1.47 |
| 2/3 | 1.43 |
| 3/4 | 1.53 |
| 4/5 | 1.21 |
| 5/6 | 1.33 |

| | Ratios | 858 | 850 | 852 | 854 | 856 |
|---|---|---|---|---|---|---|
| Reverse | -2.56 | X | | | X | X |
| Neutral | 0.00 | X | | | | X |
| 1 | 4.89 | X | X | | | X |
| 2 | 2.93 | | X | | X | X |
| 3 | 1.76 | | X | X | | X |
| 4 | 1.21 | | | X | X | X |
| 5 | 1.00 | | X | X | X | |
| 6 | 0.79 | X | | X | X | |

(X=engaged clutch)

$\dfrac{\text{Ring Gear}}{\text{Sun Gear}}$ Toothratio: $\dfrac{R_1}{S_1}=1.50$, $\dfrac{R_2}{S_2}=1.53$, $\dfrac{R_3}{S_3}=1.51$

| Ratio Spread | 6.17 |
|---|---|
| Ratio Steps | |
| Rev/1 | -0.52 |
| 1/2 | 1.67 |
| 2/3 | 1.66 |
| 3/4 | 1.46 |
| 4/5 | 1.21 |
| 5/6 | 1.26 |

| | Ratios | 958 | 950 | 952 | 954 | 956 |
|---|---|---|---|---|---|---|
| Reverse | -1.52 | X | | | X | X |
| Neutral | 0.00 | X | | | | X |
| 1 | 2.86 | X | X | | | X |
| 2 | 1.64 | | X | | X | X |
| 3 | 1.00 | | X | X | | X |
| 4 | 0.70 | | | X | X | X |
| 5 | 0.58 | | X | X | X | |
| 6 | 0.45 | X | | X | X | |

(X=engaged clutch)

$\frac{\text{Ring Gear}}{\text{Sun Gear}}$ Toothratio : $\frac{R_1}{S_1} = 1.86$, $\frac{R_2}{S_2} = 1.88$, $\frac{R_3}{S_3} = 1.88$

| Ratio Spread | 6.34 |
|---|---|
| Ratio Steps | |
| Rev/1 | -0.53 |
| 1/2 | 1.74 |
| 2/3 | 1.64 |
| 3/4 | 1.42 |
| 4/5 | 1.22 |
| 5/6 | 1.28 |

|  | Ratios | 1058 | 1050 | 1052 | 1054 | 1056 |
|---|---|---|---|---|---|---|
| Reverse | -1.98 |  | X | X | X |  |
| Neutral | 0 |  | X |  | X |  |
| 1 | 2.59 |  | X |  | X | X |
| 2 | 1.59 | X | X |  |  | X |
| 3 | 1 |  | X | X |  | X |
| 4 | 0.59 | X |  | X |  | X |
| 5 | 0.46 |  |  | X | X | X |
| 6 | 0.35 | X |  | X | X |  |

(X=engaged clutch)

$\frac{\text{Ring Gear}}{\text{Sun Gear}}$ Toothratio : $\frac{R_1}{S_1} = 1.85$, $\frac{R_2}{S_2} = 1.69$, $\frac{R_3}{S_3} = 1.69$

| Ratio Spread | 7.4 |
|---|---|
| Ratio Steps |  |
| Rev/1 | -0.76 |
| 1/2 | 1.62 |
| 2/3 | 1.59 |
| 3/4 | 1.69 |
| 4/5 | 1.26 |
| 5/6 | 1.33 |

| | Ratios | 1158 | 1150 | 1152 | 1154 | 1156 |
|---|---|---|---|---|---|---|
| Reverse | -1.83 | X | X | X | | |
| Neutral | 0.00 | | X | X | | |
| 1 | 2.61 | | X | X | | X |
| 2 | 1.57 | | X | | X | X |
| 3 | 1.00 | | X | X | X | |
| 4 | 0.75 | | | X | X | X |
| 5 | 0.55 | X | | X | X | |
| 6 | 0.42 | X | | | X | X |

(X=engaged clutch)

$\dfrac{\text{Ring Gear}}{\text{Sun Gear}}$ Toothratio : $\dfrac{R_1}{S_1}=1.87$ $\dfrac{R_2}{S_2}=1.83,$ $\dfrac{R_3}{S_3}=1.51$

| Ratio Spread | 6.19 |
|---|---|
| Ratio Steps | |
| Rev/1 | -0.70 |
| 1/2 | 1.66 |
| 2/3 | 1.57 |
| 3/4 | 1.33 |
| 4/5 | 1.37 |
| 5/6 | 1.30 |

| | Ratios | 1258 | 1250 | 1252 | 1254 | 1256 |
|---|---|---|---|---|---|---|
| Reverse | -1.60 | | X | X | | X |
| Neutral | 0.00 | | X | X | | |
| 1 | 2.61 | | X | X | X | |
| 2 | 1.61 | X | | | X | X |
| 3 | 1.00 | | | X | X | X |
| 4 | 0.66 | X | | | X | X |
| 5 | 0.54 | | X | | X | X |
| 6 | 0.41 | X | X | | | X |

(X=engaged clutch)

$\frac{\text{Ring Gear}}{\text{Sun Gear}}$ Toothratio : $\frac{R_1}{S_1}=1.94$, $\frac{R_2}{S_2}=1.80$, $\frac{R_3}{S_3}=2.60$

| Ratio Spread | 6.32 |
|---|---|
| Ratio Steps | |
| Rev/1 | -0.61 |
| 1/2 | 1.62 |
| 2/3 | 1.61 |
| 3/4 | 1.52 |
| 4/5 | 1.21 |
| 5/6 | 1.32 |

FAMILY OF MULTI-SPEED PLANETARY POWER TRANSMISSION MECHANISMS HAVING THREE PLANETARY GEARSETS

TECHNICAL FIELD

This invention relates to planetary transmissions and, more particularly, to planetary transmissions providing at least six forward speed ratios and one reverse speed ratio from three planetary gearsets and five torque-transmitting mechanisms.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier employs three planetary gearsets, three clutches and two brakes to provide six forward speed ratios and one reverse ratio. One of the planetary gearsets in Lepelletier is positioned and operated to establish two fixed speed input members ( one equal to unity and the other a reduced speed) for the remaining two planetary gearsets.

SUMMARY OF THE INVENTION

It is an object of the present invention to provide an improved multi-speed planetary transmission having three planetary gearsets selectively interconnectible to establish at least six forward speed ratios and one reverse speed ratio between an input shaft and an output shaft.

In one aspect of the present invention, an interconnecting member continuously connects a first member of the first planetary gearset with a first member of the second planetary gearset.

In another aspect of the present invention, a first member of third planetary gearset is continuously connected with a stationary member, such as a transmission case or housing.

In yet another aspect of the present invention, the input shaft is continuously connected with a member of the planetary gearsets and the output shaft is also continuously connected with a member of the planetary gearsets.

In another aspect of the present invention, five torque transmitting mechanisms cooperate with the planetary gearsets to establish the six or more forward speed ratios and the one reverse speed ratio.

In yet still another aspect of the present invention, a first of the torque-transmitting mechanisms selectively interconnects a member of the first planetary gearset with either the input shaft, the output shaft, or a member of the second or third planetary gearset.

In a further aspect of the present invention, a second of the torque-transmitting mechanisms selectively interconnects a member of the second planetary gearset with either the input shaft, the output shaft, or a member of the first or third planetary gearset.

In a yet further aspect of the present invention, a third of the torque transmitting mechanisms selectively connects a member of the third planetary gearset with the input shaft, the output shaft, the interconnecting member, or a member of the first or second planetary gearset.

In a yet still further aspect of the present invention, a fourth of the torque-transmitting mechanisms selectively interconnects a member of one of the planetary gearsets with either the interconnecting member or another member of one of the planetary gearsets.

In a yet still further aspect of the present invention, a fifth of the torque-transmitting mechanisms operates as either a clutch or a brake.

In a further aspect of the present invention, the fifth torque-transmitting mechanism operating as a clutch selectively interconnects a member of one of the planetary gearsets with another member of one of the planetary gearsets, or when operating as a brake, selectively connects a member of one of the planetary gearsets with the stationary member of the transmission.

In a further aspect of the present invention, the five selectively engageable torque-transmitting mechanisms are engaged in combinations of three to establish at least six forward speed ratios and one reverse speed ratio between the input shaft and the output shaft.

In another aspect of the present invention, each of the planetary gearsets has three members which can be any one of a sun gear member, a ring gear member, or a planet carrier assembly member.

In yet another aspect of the present invention, the planet carrier assembly member can be of either a single pinion (simple) type or a double pinion (compound) type.

DESCRIPTION OF THE EXEMPLARY EMBODIMENT

Figures 1, 2:
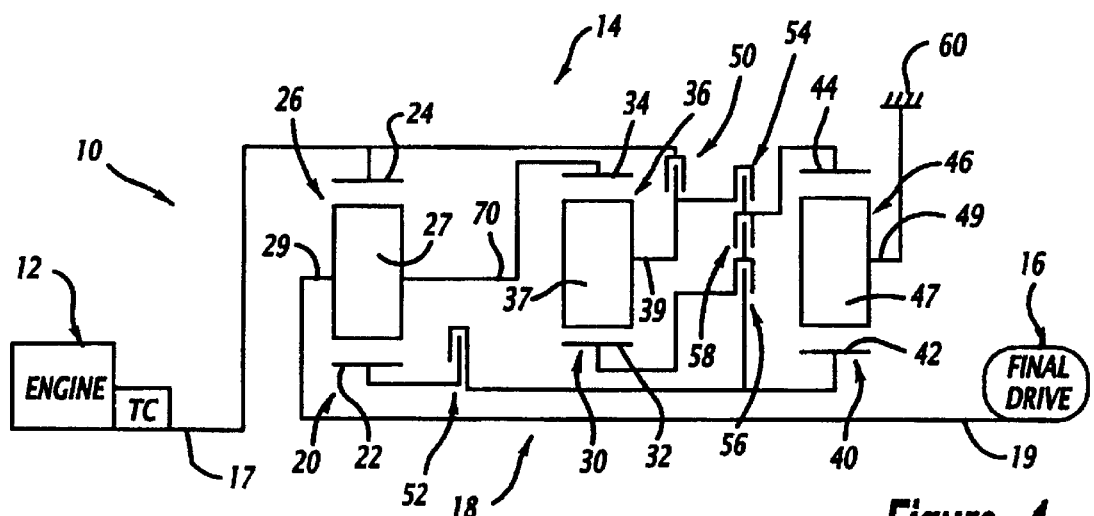
FIG. 1 is a schematic representation of a powertrain incorporating a family member of the present invention.
FIG. 2 is a truth table and chart of some of the operating characteristics of the family member shown in FIG. 1.

Referring to the drawings, wherein like characters represent the same or corresponding parts throughout the several views, there is shown in FIG. 1 a powertrain 10 including a conventional engine and torque converter 12, a multi-speed planetary transmission 14, and a conventional final drive mechanism 16. The planetary transmission 14 includes an input shaft 17 which is continuously connected with the engine 12, a planetary gear arrangement 18, and an output shaft 19 which is drivingly connected with the final drive mechanism 16.

The planetary gear arrangement 18 includes three planetary gearsets 20, 30, and 40, and five torque-transmitting mechanisms 50, 52, 54, 56, and 58. The five torque-transmitting mechanisms are conventional rotating type torque-transmitting mechanisms, commonly termed clutches. The torque-transmitting mechanisms are preferably fluid-operated electronically controlled friction devices which are well known in the art of power transmissions.

The planetary gearset 20 includes a sun gear member 22, a ring gear member 24, and a planet carrier assembly member 26. The planet carrier assembly member 26 has a plurality of pinion gears 27 rotatably mounted on a carrier 29 and disposed in meshing relationship with the sun gear member 22 and the ring gear member 24.

The planetary gearset 30 includes a sun gear member 32, a ring gear member 34, and a planet carrier assembly member 36. The planet carrier assembly member 36 has a plurality of pinion gears 37 rotatably mounted on a carrier 39 and disposed in meshing relationship with both the sun gear member 32 and the ring gear member 34.

The planetary gearset 40 includes a sun gear member 42, a ring gear member 44, and planet carrier assembly member 46. The planet carrier assembly member 46 includes a plurality of pinion gears 47 rotatably mounted on a carrier 49 and disposed in meshing relationship with both the sun gear member 42 and the ring gear member 44. Each of the planetary gearsets 20, 30, and 40 are of the simple planetary gearset type wherein a plurality of single pinion gears meshes with both the sun gear member of the planetary gearset and the ring gear member of the planetary gearset.

The planet carrier assembly member 26 and ring gear member 34 are continuously interconnected by an interconnecting member 70 which is also continuously connected with the output shaft 19. The input shaft 17 is continuously connected with the ring gear member 24 and selectively connectible with the planet carrier assembly member 36 through the torque-transmitting mechanism 50. The sun gear member 22 is selectively connectible with the sun gear member 42 through the torque-transmitting mechanism 52. The sun gear member 42 is selectively connectible with the sun gear member 32 through the torque-transmitting mechanism 56. The planet carrier assembly member 36 is selectively connectible with the ring gear member 44 through the torque-transmitting mechanism 54. The sun gear member 32 is selectively connectible with the ring gear member 44 through the torque-transmitting mechanism 58. The planet carrier assembly member 46 is continuously connected with a stationary portion of the transmission 14, such as a housing 60.

As seen in FIG. 2, the torque-transmitting mechanisms 50, 52, 54, 56, and 58 are selectively engaged in combinations of three to establish a reverse speed ratio and seven forward speed ratios between the input shaft 17 and the output shaft 19.

To establish the reverse speed ratio, the torque-transmitting mechanisms 50, 52, and 54 are engaged. During the reverse speed ratio, the ring gear member 44 is driven at the speed of the input shaft 17. The sun gear member 42 is driven in reverse, as is the sun gear member 22, at a speed determined by the speed of the ring gear member 44 and the ring gear/sun gear tooth ratio of the planetary gearset 40. The planet carrier assembly member 26 and therefore output shaft 19 are driven in reverse at a speed determined by the speed of the sun gear member 22, the speed of the ring gear member 24, and the ring gear/sun gear tooth ratio of the planetary gearset 20. The numerical value of the reverse speed ratio is determined by the ring gear/sun gear tooth ratios of the planetary gearsets 20 and 40.

The first forward speed ratio is established with the engagement of the torque-transmitting mechanisms 52, 54, and 58. As noted in the truth table, the torque-transmitting mechanisms 52 and 54 can remain engaged through a neutral condition thus simplifying a forward/reverse interchange. During the first forward speed ratio, the sun gear member 22 and sun gear member 42 are driven at a speed determined by the speed of the ring gear member 24, the speed of the planet carrier assembly member 26, and the ring gear/sun gear tooth ratio of the planetary gearset 20. The ring gear member 44, the entire planetary gearset 30, the planet carrier assembly member 26 and therefore output shaft 19 are driven forwardly at a speed determined by the speed of the sun gear member 42 and the ring gear/sun gear tooth ratio of the planetary gearset 40. The numerical value of the first forward speed ratio is determined by the ring gear/sun gear tooth ratios of the planetary gearsets 20 and 40.

The second forward speed ratio is established with the engagement of the torque-transmitting mechanisms 52, 54, and 56. During the second forward speed ratio, the sun gear members 22, 32, and 42 are all driven in reverse at a speed determined by the speed of the ring gear member 24, the speed of the planet carrier assembly member 26, and the ring gear/sun gear tooth ratio of the planetary gearset 20. The ring gear member 44 and planet carrier assembly member 36 are driven forwardly at a speed determined by the speed of the sun gear member 42 and the ring gear/sun gear tooth ratio of the planetary gearset 40. The ring gear member 34 and therefore output shaft 19 are driven forwardly at a speed determined by the speed of the sun gear member 32, the speed of the planet carrier assembly member 36, and the ring gear/sun gear tooth ratio of the planetary gearset 30. The numerical value of the second forward speed ratio is determined by the planetary gearsets 20, 30, and 40.

The third forward speed ratio is established with the engagement of the torque-transmitting mechanisms 52, 56, and 58. This combination of engagements holds the sun gear member 22 stationary. The planet carrier assembly member 26 and therefore output shaft 19 are driven forwardly at a speed determined by the speed of the ring gear member 24 and the ring gear/sun gear tooth ratio of the planetary gearset 20. The numerical value of the third forward speed ratio is determined by the ring gear/sun gear tooth ratio of the planetary gearset 20.

During the fourth forward speed ratio, all three members of the planetary gearsets 20 and 30 are interconnected, therefore each of the planetary gearsets rotate as a single unit. Thus, the fourth forward speed ratio is a direct drive having a ratio of one.

The fifth forward speed ratio is established with the engagement of the torque-transmitting mechanisms 50, 56, and 58. This combination of engagements connects the input shaft 17 directly with the planet carrier assembly member 36 and the sun gear member 32 with the transmission housing 60. During the fifth forward speed ratio, the ring gear member 34 and therefore the output shaft 19 are driven forwardly at an increased speed determined by the speed of the planet carrier assembly member 36 and the ring gear/sun gear tooth ratio of the planetary gearset 30. The numerical value of the fifth forward speed ratio is determined by the ring gear/sun gear tooth ratio of the planetary gearset 30.

The sixth forward speed ratio is established with the engagement of the torque-transmitting mechanisms 50, 52, and 58. During the sixth forward speed ratio, the sun gear members 22 and 42 are driven in reverse at a speed determined by the speed of the ring gear member 24, the speed of the planet carrier assembly member 26, and the ring gear/sun gear tooth ratio of the planetary gearset 20. The ring gear member 44 and sun gear member 32 are driven forwardly at a speed determined by the speed of the sun gear member 42 and the ring gear/sun gear tooth ratio of the planetary gearset 40. The ring gear member 34 and therefore output shaft 19 are driven forwardly at a speed determined by the speed of the sun gear member 32, the speed of the planet carrier assembly member 36, and the ring gear/sun gear tooth ratio of the planetary gearset 30. The numerical value of the sixth forward speed ratio is determined by all three planetary gearsets 20, 30, and 40.

To establish the seventh forward speed ratio between the input shaft 17 and output shaft 19, the torque-transmitting mechanisms 50, 54, and 56 are engaged. During the seventh forward speed ratio, the sun gear members 42 and 32 are driven in reverse at a speed determined by the speed of the ring gear member 44 and the ring gear/sun gear tooth ratio of the planetary gearset 40. The ring gear member 34 and therefore output shaft 19 are driven forwardly at a speed determined by the speed of the planet carrier assembly member 36, the speed of the sun gear member 32, and the ring gear/sun gear tooth ratio of the planetary gearset 30. The numerical value of the seventh forward speed ratio is determined by the ring gear/sun gear tooth ratios of the planetary gearsets 30 and 40.

As seen in FIG. 2, the single step forward transition interchanges, with the exception of the sixth-to-seventh interchange, are all single transition interchanges. All of the double step forward interchanges are single transition interchanges. Also presented in FIG. 2, are examples of the ratios that can be established utilizing the planetary gear arrangement shown in FIG. 1 when the sample ring gear/sun gear tooth ratios given in FIG. 2 are used. The sample ring gear/sun gear tooth ratios are expressed in terms of R1/S1, R2/S2, and R3/S3, which have the ring gear/sun gear tooth ratios for the planetary gearsets 20, 30, and 40, respectively. Further information given in FIG. 2 is the ratio steps between adjacent forward speed ratios as well as the ratio steps between reverse and the first forward speed ratio. These values are given for both the six-speed transmission and the seven-speed transmission.

Figures 3, 4:
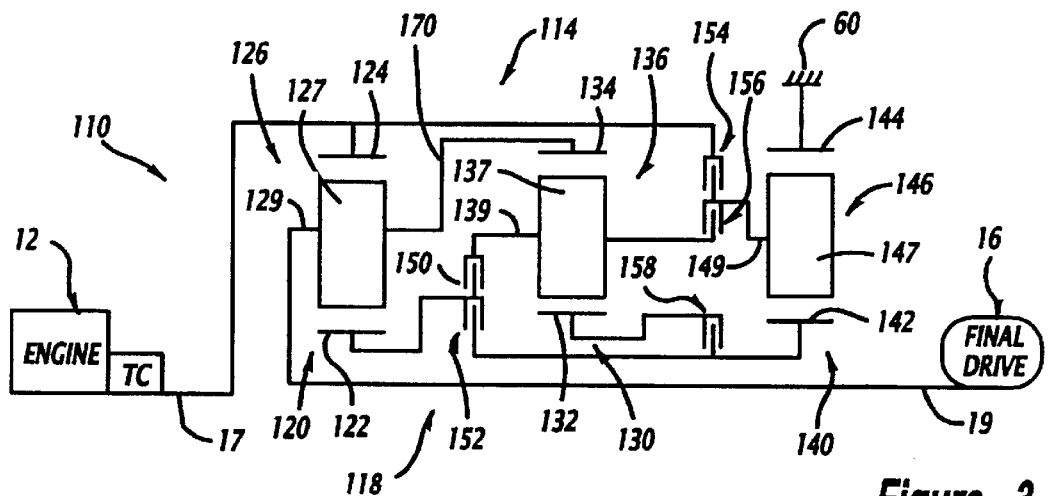
FIG. 3 is a schematic representation of another powertrain having a family member incorporating the present invention.
FIG. 4 is a truth table and chart depicting some of the operating characteristics of the present invention shown in FIG. 3.

As seen in FIG. 3, a powertrain 110 includes the conventional engine and torque converter 12, a planetary transmission 114, and the final drive mechanism 16. The planetary transmission 114 includes a planetary gear arrangement 118 having three planetary gearsets 120, 130, and 140, and five torque-transmitting mechanisms 150, 152, 154, 156, and 158. The planetary transmission 114 also includes the input shaft 17, which is continuously connected with the engine 12, and an output shaft 19, which is drivingly connected with the final drive mechanism 16. The five torque-transmitting mechanisms are conventional rotating type torque-transmitting mechanisms, commonly termed clutches. The torque-transmitting mechanisms are preferably fluid-operated electronically controlled friction devices, which are well known in the art of power transmissions.

The planetary gearset 120 includes a sun gear member 122, a ring gear member 124, and a planet carrier assembly member 126. The planet carrier assembly member 126 has a plurality of pinion gears 127 rotatably mounted on a carrier 129 and disposed in meshing relationship with the sun gear member 122 and the ring gear member 124.

The planetary gearset 130 includes a sun gear member 132, a ring gear member 134, and a planet carrier assembly member 136. The planet carrier assembly member 136 has a plurality of pinion gears 137 rotatably mounted on a carrier 139 and disposed in meshing relationship with both the sun gear member 132 and the ring gear member 134.

The planetary gearset 140 includes a sun gear member 142, a ring gear member 144, and planet carrier assembly member 146. The planet carrier assembly member 146 includes a plurality of pinion gears 147 rotatably mounted on a carrier 149 and disposed in meshing relationship with both the sun gear member 142 and the ring gear member 144. Each of the planetary gearsets 120, 130, and 140 are of the simple planetary gearset type wherein a plurality of single pinion gears meshes with both the sun gear member of the planetary gearset and the ring gear member of the planetary gearset.

The planet carrier assembly member 126 and ring gear member 134 are continuously interconnected by an interconnecting member 170, which is also connected continuously with the output shaft 19. The input shaft 17 is continuously connected with the ring gear member 124 and selectively connectible with the planet carrier assembly member 146 through the torque-transmitting mechanism 154. The ring gear member 144 is continuously connected with the transmission housing 60. The sun gear member 122 is selectively connectible with the planet carrier assembly member 136 through the torque-transmitting mechanism 150 and selectively connectible with the sun gear member 142 through the torque-transmitting mechanism 152. The sun gear member 132 is selectively connectible with the sun gear member 142 through the torque-transmitting mechanism 158. The planet carrier assembly member 136 and the planet carrier assembly member 146 are selectively interconnectible by the torque-transmitting mechanism 156. As seen in FIG. 4, the torque-transmitting mechanisms are selectively engaged in combinations of three to provide six forward speed ratios and one reverse speed ratio.

During the reverse speed ratio, the torque-transmitting mechanisms 154, 156, and 158 are engaged. During the reverse speed ratio, the planet carrier assembly members 146 and 136 are driven forwardly by the input shaft 17. The sun gear member 142 and sun gear member 132 are driven forwardly at a speed determined by the speed of the planet carrier assembly member 146 and the ring gear/sun gear tooth ratio of the planetary gearset 140. The ring gear member 134 and therefore output shaft 19 are driven forwardly at a speed determined by the speed of the sun gear member 132, the speed of the planet carrier assembly member 136, and the ring gear/sun gear tooth ratio of the planetary gearset 130. The numerical value of the reverse speed ratio is determined by the ring gear/sun gear tooth ratios of the planetary gearsets 130 and 140. As noted in the truth table of FIG. 4, the torque-transmitting mechanisms 156 and 158 can remain engaged through the neutral condition thereby simplifying the forward/reverse interchange.

The first forward speed ratio is established with the engagement of the torque-transmitting mechanisms 152, 156, and 158. During the first forward speed ratio, the sun gear members 122, 132, and 142 are driven in reverse at a speed determined by the speed of the ring gear member 134, the speed of the planet carrier assembly member 126, and the ring gear/sun gear tooth ratio of the planetary gearset 120. The planet carrier assembly members 146 and 136 are driven in reverse at a speed determined by the speed of the sun gear member 142 and the ring gear/sun gear tooth ratio of the planetary gearset 140. The ring gear members 134, planet carrier assembly member 126 and therefore output shaft 19 are driven forwardly at a speed determined by the speed of the sun gear member 132, the speed of the planet carrier assembly member 136, and the ring gear/sun gear tooth ratio of the planetary gearset 130. The numerical value of the first forward speed ratio is determined by all three planetary gearsets 120, 130, and 140.

During the second forward speed ratio, the sun gear member 122, planet carrier assembly member 136, and planet carrier assembly member 146 are driven in reverse at a speed determined by the speed of the ring gear member 124, the speed of the planet carrier assembly member 126, and the ring gear/sun gear tooth ratio of the planetary gearset 120. The sun gear members 142 and 132 are driven in reverse at a speed determined by the speed planet carrier assembly member 146 and the ring gear/sun gear tooth ratio of the planetary gearset 140. The ring gear member 134 and therefore output shaft 19 are driven forwardly at a speed determined by the speed of the sun gear member 132, the speed of the planet carrier assembly member 136, and the ring gear/sun gear tooth ratio of the planetary gearset 130. The numerical value of the second forward speed ratio is determined by the ring gear/sun gear tooth ratios of all three planetary gearsets 120, 130, and 140.

The third forward speed ratio is established with the engagement of the torque-transmitting mechanisms 150, 152, and 156. With this combination of engagements, the sun gear member 122 is held stationary. The planet carrier assembly member 126 and therefore output shaft 19 are driven forwardly at a speed determined by the speed of the ring gear member 124 and the ring gear/sun gear tooth ratio of the planetary gearset 120. The numerical value of the third forward speed ratio is determined by the ring gear/sun gear tooth ratio of planetary gearset 120.

The fourth forward speed ratio is established with the engagement of the torque-transmitting mechanisms 150, 152, and 158. During the fourth forward speed ratio, the planetary gearsets 120 and 130 are interconnected such that they rotate in unison thereby providing a direct drive between the input shaft 17 and the output shaft 19. The numerical value of the fourth forward speed ratio is one.

The fifth forward speed ratio is established with the engagement of the torque-transmitting mechanisms 150, 154, and 158. During the fifth forward speed ratio, the sun gear members 142 and 132 are driven forwardly at an increased speed ratio determined by the speed of the planet carrier assembly member 146 and the ring gear/sun gear tooth ratio of the planetary gearset 140. The planet carrier assembly member 136 and sun gear member 122 are driven forwardly at a speed determined by the speed of the sun gear member 132, the speed of the ring gear member 134, and the ring gear/sun gear tooth ratio of the planetary gearset 130. The planet carrier assembly member 126 and therefore output shaft 19 are driven forwardly at a speed determined by the speed of the ring gear member 124, the speed of the sun gear member 122, and the ring gear/sun gear tooth ratio of the planetary gearset 120. The numerical value of the fifth forward speed ratio is determined by the ring gear/sun gear tooth ratios of all three planetary gearsets 120, 130, and 140.

The sixth forward speed ratio is established with the engagement of the torque-transmitting mechanisms 150, 152, and 154. During the sixth forward speed ratio, the sun gear members 142 and 122 are driven forwardly at a speed determined by the speed of the planet carrier assembly member 146 and the ring gear/sun gear tooth ratio of the planetary gearset 140. The planet carrier assembly member 126 and therefore output shaft 19 are driven forwardly at an increased speed ratio determined by the speed of the sun gear member 122, the speed of the ring gear member 124, and the ring gear/sun gear tooth ratio of the planetary gearset 120. The numerical value of the sixth forward speed ratio is determined by the ring gear/sun gear tooth ratios of the planetary gearsets 120 and 140.

Figures 5, 6:
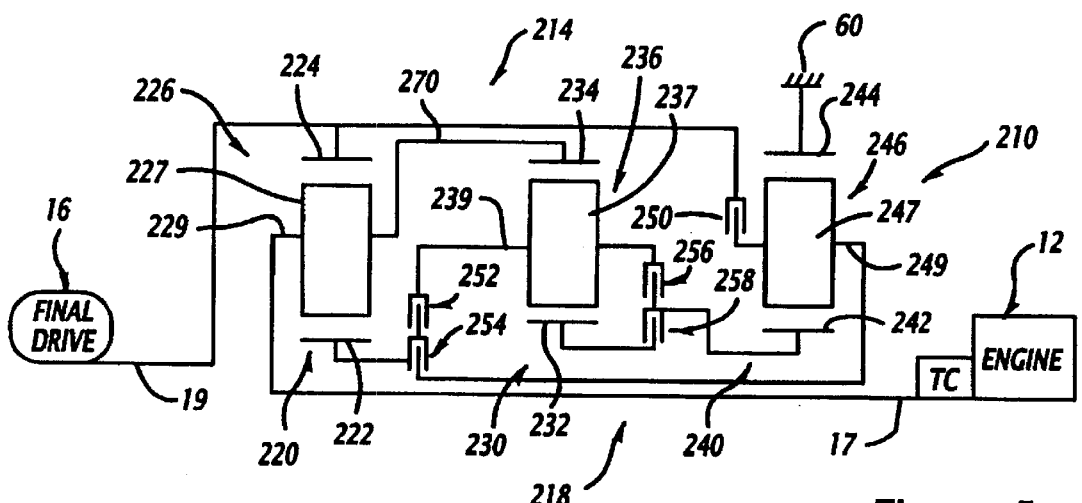
FIG. 5 is a schematic representation of another powertrain having a family member incorporating the present invention.
FIG. 6 is a truth table and chart depicting some of the operating characteristics of the present invention shown in FIG. 5.

The powertrain 210, shown in FIG. 5, includes the conventional engine and torque converter 12, a planetary transmission 214, and the conventional final drive mechanism 16. The planetary transmission 214 includes the input shaft 17 continuously connected with the engine 12, a planetary gear arrangement 218, and the output shaft 19 continuously connected with the final drive mechanism 16. The planetary gear arrangement 218 includes three planetary gearsets 220, 230, and 240, and five torque-transmitting mechanisms 250, 252, 254, 256, and 258.

The five torque-transmitting mechanisms are conventional rotating type torque-transmitting mechanisms, commonly termed clutches. The torque-transmitting mechanisms are preferably fluid-operated electronically controlled friction devices, which are well known in the art of power transmissions.

The planetary gearset 220 includes a sun gear member 222, a ring gear member 224, and a planet carrier assembly member 226. The planet carrier assembly member 226 has a plurality of pinion gears 227 rotatably mounted on a carrier 229 and disposed in meshing relationship with the sun gear member 222 and the ring gear member 224.

The planetary gearset 230 includes a sun gear member 232, a ring gear member 234, and a planet carrier assembly member 236. The planet carrier assembly member 236 has a plurality of pinion gears 237 rotatably mounted on a carrier 239 and disposed in meshing relationship with both the sun gear member 232 and the ring gear member 234.

The planetary gearset 240 includes a sun gear member 242, a ring gear member 244, and planet carrier assembly member 246. The planet carrier assembly member 246 includes a plurality of pinion gears 247 rotatably mounted on a carrier 249 and disposed in meshing relationship with both the sun gear member 242 and the ring gear member 244. Each of the planetary gearsets 220, 230, and 240 are of the simple planetary gearset type wherein a plurality of single pinion gears meshes with both the sun gear member of the planetary gearset and the ring gear member of the planetary gearset.

The planet carrier assembly member 226 and ring gear member 234 are continuously interconnected by an interconnecting member 270, which is also continuously connected with the input shaft 17. The ring gear member 224 is continuously connected with the output shaft 19, which is selectively connectible with the planet carrier assembly member 246 through the torque-transmitting mechanism 250. The ring gear member 244 is continuously connected with the transmission housing 60. The sun gear member 222 is selectively connectible with the planet carrier assembly member 236 through the torque-transmitting mechanism 252, and selectively connectible with the planet carrier assembly member 246 through the torque-transmitting mechanism 254. The sun gear member 232 is selectively connectible with the sun gear member 242 through the torque-transmitting mechanism 258. The planet carrier assembly member 236 is selectively connectible with the sun gear member 242 through the torque-transmitting mechanism 256. The torque-transmitting mechanisms are selectively engageable in combinations of three, as shown in the truth table of FIG. 6, to provide six forward speed ratios and one reverse ratio between the input shaft 17 and the output shaft 19.

During the reverse speed ratio, the sun gear member 232 and sun gear member 242 are driven at a speed determined by the speed of the ring gear member 234, the speed of the planet carrier assembly member 236 and the ring gear/sun gear tooth ratio of the planetary gearset 230. The planet carrier assembly member 246, the sun gear member 222, and planet carrier assembly member 236 are driven at a speed determined by the speed of the sun gear member 242 and the ring gear/sun gear tooth ratio of the planetary gearset 240. The ring gear member 224 and therefore output shaft 19 are driven in reverse at a speed determined by the speed of the sun gear member 222, the speed of the planet carrier assembly member 226, and the ring gear/sun gear tooth ratio of the planetary gearset 220. The numerical value of the reverse speed ratio is determined by the ring gear/sun gear tooth ratios of the planetary gearset 220, 230, and 240.

The first forward speed ratio is established with the engagement of the torque-transmitting mechanisms 250, 256, and 258. With this combination of engagements, the sun gear member 242 is driven by the input shaft 17. The planet carrier assembly member 246 and therefore output shaft 19 are driven forwardly at a speed determined by the speed of the sun gear member 242 and the ring gear/sun gear tooth ratio of the planetary gearset 240. The numerical value of the first forward speed ratio is determined by the ring gear/sun gear tooth ratio of the planetary gearset 240.

The second forward speed ratio is established with the engagement of the torque-transmitting mechanisms 250, 252, and 256. During the second forward speed ratio, the sun gear member 222, planet carrier assembly member 236, and sun gear member 242 are driven forwardly at a speed determined by the speed of the planet carrier assembly member 226, the speed of the ring gear member 224, and the ring gear/sun gear tooth ratio of the planetary gearset 220. The planet carrier assembly member 246, ring gear member 224, and output shaft 19 are driven forwardly at a speed determined by the speed of the sun gear member 242 and ring gear/sun gear tooth ratio of the planetary gearset 240. The numerical value of the second forward speed ratio is determined by the ring gear/sun gear tooth ratios of the planetary gearsets 220 and 240.

The third forward speed ratio is established with the engagement of the torque-transmitting mechanisms 250, 252, and 258. During the third forward speed ratio, the sun gear member 222 and planet carrier assembly member 236 are driven at a speed determined by the speed of the planet carrier assembly member 226 and the ring gear member 224.

The sun gear members 232 and 242 are driven at a speed determined by the speed of the planet carrier assembly member 236, the speed of the ring gear member 234, and the ring gear/sun gear tooth ratio of the planetary gearset 230. The planet carrier assembly member 246 and therefore output shaft 19 are driven at a speed determined by the speed of the sun gear member 242 and the ring gear/sun gear tooth ratio of the planetary gearset 240. The numerical value of the third forward speed ratio is determined by the ring gear/sun gear tooth ratios all three planetary gearsets 220, 230, and 240.

The fourth forward speed ratio is established with the engagement of the torque-transmitting mechanisms 252, 256, and 258. The engagement of this combination of torque-transmitting mechanisms effectively interconnects the planetary gearsets 220 and 230 so that they rotate in unison with input shaft 17 and output shaft 19 and therefore the fourth forward speed ratio is a direct drive having a value of one.

The fifth forward speed ratio is established with the engagement of the torque-transmitting mechanisms 254, 256, and 258. During the fifth forward speed ratio, the planetary gearset 230 and the sun gear member 242 are driven at a speed equal to the speed of the input shaft 17. The planet carrier assembly member 246 and sun gear member 222 are driven forwardly at a speed determined by the speed of the sun gear member 242 and the ring gear/sun gear tooth ratio of the planetary gearset 240. The ring gear member 224 and therefore output shaft 19 are driven forwardly at a speed determined by the speed of the input shaft 17 and planet carrier assembly member 226, the speed of the sun gear member 222 and the ring gear/sun gear tooth ratio of the planetary gearset 220. The numerical value of the fifth forward speed ratio is determined by the ring gear/sun gear tooth ratios of the planetary gearsets 220 and 240.

The sixth forward speed ratio is established with the engagement of the torque-transmitting mechanisms 252, 254, and 256. During the sixth forward speed ratio, the sun gear member 222 is effectively grounded to the transmission housing 60. During the sixth forward speed ratio, the ring gear member 224 and therefore output shaft 19 are driven forwardly at an increased speed ratio determined by the speed of the planet carrier assembly member 226 and the ring gear/sun gear tooth ratio of the planetary gearset 220. The numerical value of the sixth forward speed ratio is determined by the ring gear/sun gear tooth ratio of the planetary gearset 220.

As seen in the truth table of FIG. 6, all of the single step forward ratio interchanges are of the single transition type. The truth table and chart of FIG. 6 also provide an example of the numerical values of the speed ratios and the ratio steps that are attainable with the planetary gear arrangement 218 when utilizing the sample ring gear/sun gear tooth ratios given as R1/S1, R2/S2, and R3/S3, which are the ring gear/sun gear tooth ratios for the planetary gearsets 220, 230, and 240, respectively.

Figures 7, 8:
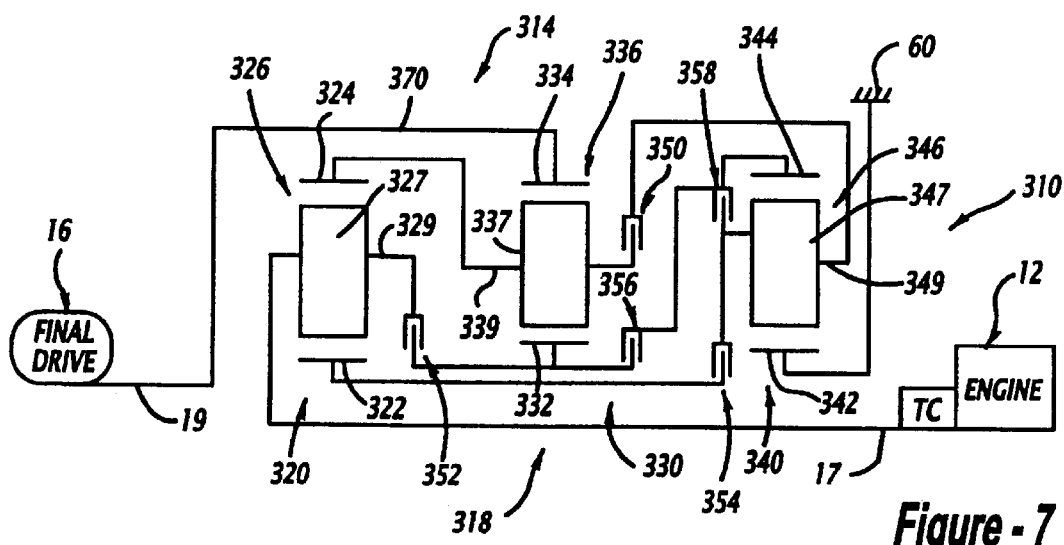
FIG. 7 is a schematic representation of another powertrain having a family member incorporating the present invention.
FIG. 8 is a truth table and chart depicting some of the operating characteristics of the present invention shown in FIG. 7.

A powertrain 310, shown in FIG. 7, includes the conventional engine and torque converter 12, a planetary transmission 314, and the final drive mechanism 16. The planetary transmission 314 includes the input shaft 17, the planetary gear arrangement 318, and the output shaft 19. The planetary gear arrangement 318 includes three planetary gearsets 320, 330, and 340, and five torque-transmitting mechanisms 350, 352, 354, 356, and 358.

The five torque-transmitting mechanisms are conventional rotating type torque-transmitting mechanisms, commonly termed clutches. The torque-transmitting mechanisms are preferably fluid-operated electronically controlled friction devices, which are well known in the art of power transmissions.

The planetary gearset 320 includes a sun gear member 322, a ring gear member 324, and a planet carrier assembly member 326. The planet carrier assembly member 326 has a plurality of pinion gears 327 rotatably mounted on a carrier 329 and disposed in meshing relationship with the sun gear member 322 and the ring gear member 324.

The planetary gearset 330 includes a sun gear member 332, a ring gear member 334, and a planet carrier assembly member 336. The planet carrier assembly member 336 has a plurality of pinion gears 337 rotatably mounted on a carrier 339 and disposed in meshing relationship with both the sun gear member 332 and the ring gear member 334.

The planetary gearset 340 includes a sun gear member 342, a ring gear member 344, and planet carrier assembly member 346. The planet carrier assembly member 346 includes a plurality of pinion gears 347 rotatably mounted on a carrier 349 and disposed in meshing relationship with both the sun gear member 342 and the ring gear member 344. Each of the planetary gearsets 320, 330, and 340 are of the simple planetary gearset type wherein a plurality of single pinion gears meshes with both the sun gear member of the planetary gearset and the ring gear member of the planetary gearset.

The ring gear member 324 and planet carrier assembly member 326 are continuously interconnected by an interconnecting member 370. The planet carrier assembly member 326 is continuously connected with the input shaft 17 and selectively connectible with the sun gear member 332 through the torque-transmitting mechanism 352. The output shaft 19 is continuously connected with the ring gear member 334. The sun gear member 342 is continuously connected with the transmission housing 60. The sun gear member 322 is selectively connectible with the planet carrier assembly member 346 through the torque-transmitting mechanism 354. The sun gear member 332 is selectively connectible with the ring gear member 344 through the torque-transmitting mechanism 356. The ring gear member 344 is selectively connectible with the planet carrier assembly member 346 through the torque-transmitting mechanism 358. The interconnecting member 370 is selectively connectible with the planet carrier assembly member 346 through the torque-transmitting mechanism 350.

As seen in FIG. 8 and the truth table shown therein, the torque-transmitting mechanisms are selectively engageable in combinations of three to provide six forward speed ratios and one reverse speed ratio between the input shaft 17 and the output shaft 19.

The reverse speed ratio is established with the engagement of the torque-transmitting mechanisms 350, 352, and 358. During the reverse speed ratio, the planet carrier assembly member 336 is effectively connected with the transmission housing 60. The sun gear member 332 is driven by the input shaft 17. The ring gear member 334 is driven in reverse at a speed determined by the speed of the sun gear member 332 and the ring gear/sun gear tooth ratio of the planetary gearset 330. The numerical value of the reverse speed ratio is determined by the ring gear/sun gear tooth ratio of the planetary gearset 330.

The first forward speed ratio is established with the engagement of the torque-transmitting mechanisms 350, 352, and 356. As seen in the truth table of FIG. 8, the torque-transmitting mechanisms 350 and 352 can remain engaged through a neutral condition thereby simplifying the forward/reverse shift. During the first forward speed ratio, the sun gear member 332 and ring gear member 344 are driven by the input shaft 17. The planet carrier assembly member 346 and planet carrier assembly member 336 are driven at a speed determined by the speed of the ring gear member 344 and the ring gear/sun gear tooth ratio of the planetary gearset 340. The ring gear member 334 and output shaft 19 are driven at a speed determined by the speed of the sun gear member 332, the speed of the planet carrier assembly member 336, and the ring gear/sun gear tooth ratio of the planetary gearset 330. The numerical value of the first forward speed ratio is determined by the ring gear/sun gear tooth ratios of the planetary gearsets 330 and 340.

The second forward speed ratio is established with the engagement of the torque-transmitting mechanisms 350, 354, and 356. During the second forward speed ratio, the planet carrier assembly member 346 is driven at a speed equal to the input shaft 17. The ring gear member 344 and sun gear member 332 are driven at a speed determined by the speed of the planet carrier assembly member 346 and the ring gear/sun gear tooth ratio of the planetary gearset 340. The ring gear member 334 and output shaft 19 are driven at a speed determined by the speed of the sun gear member 332, the speed of the planet carrier assembly member 336 (input), and the ring gear/sun gear tooth ratio of the planetary gearset 330. The numerical value of the second forward speed ratio is determined by the ring gear/sun gear tooth ratios of the planetary gearsets 330 and 340.

The third forward speed ratio is established with the engagement of the torque-transmitting mechanisms 350, 352, and 354. This combination of engagements causes the planetary gearsets 320 and 330 to operate in unison with the input shaft 17 and output shaft 19 such that the third forward speed ratio is a direct drive having a ratio value of one.

The fourth forward speed ratio is established with the engagement of the torque-transmitting mechanisms 352, 354, and 356. During the fourth forward speed ratio, the sun gear member 332, the ring gear member 344, and planet carrier assembly member 326 are driven directly by the input shaft 17. The planet carrier assembly member 346 and sun gear member 322 are driven at a speed determined by the speed of the ring gear member 344 and the ring gear/sun gear tooth ratio of the planetary gearset 340. The ring gear member 324 and planet carrier assembly member 336 are driven at a speed determined by the speed of the sun gear member 322, the speed of the planet carrier assembly member 326, and the ring gear/sun gear tooth ratio of the planetary gearset 320. The ring gear member 334 and therefore output shaft 19 are driven at a speed determined by the speed of the sun gear member 332, the speed of the planet carrier assembly member 336, and the ring gear/sun gear tooth ratio of the planetary gearset 330. The numerical value of the fourth forward speed ratio is determined by the ring gear/sun gear tooth ratios of the planetary gearsets 320, 330, and 340.

The fifth forward speed ratio is established with the engagement of the torque-transmitting mechanisms 352, 354, and 358. During the fifth forward speed ratio, the sun gear member 322 is effectively grounded to the transmission housing 60. The ring gear member 324 and planet carrier assembly member 336 are driven forwardly at a speed determined by the speed of the planet carrier assembly member 326 and the ring gear/sun gear tooth ratio of the planetary gearset 320. The ring gear member 334 and therefore output shaft 19 are driven at a speed determined by the speed of the sun gear member 332, the speed of the planet carrier assembly member 336, and ring gear/sun gear tooth ratio of the planetary gearset 330. The numerical value of the fifth forward speed ratio is determined by the ring gear/sun gear tooth ratios of the planetary gearsets 320 and 330.

The sixth forward speed ratio is established with the engagement of the torque-transmitting mechanisms 354, 356, and 358. During the sixth forward speed ratio, both the sun gear member 322 and sun gear member 332 are effectively connected with the transmission housing 60. During the sixth forward speed ratio, the ring gear member 324 and planet carrier assembly member 336 are driven forwardly at a speed determined by the speed of the planet carrier assembly member 326 and the ring gear/sun gear tooth ratio of the planetary gearset 320. The ring gear member 344 and therefore output shaft 19 are driven at a speed determined by the speed of the planet carrier assembly member 336 and the ring gear/sun gear tooth ratio of the planetary gearset 330. The numerical value of the sixth forward speed ratio is determined by the ring gear/sun gear tooth ratios of the planetary gearsets 320 and 330.

As seen in the truth table of FIG. 8, all of the single step and double step forward interchanges are single transition type interchanges. The truth table and chart provide numerical examples of the speed ratios and ratio steps that are attainable with the planetary gear arrangement 318 when utilizing the sample ring gear/sun gear tooth ratios R1/S1, R2/S2, and R3/S3 which are given in FIG. 8 and are the ring gear/sun gear tooth ratios of the planetary gearsets 320, 330, and 340, respectively.

Figures 9, 10:
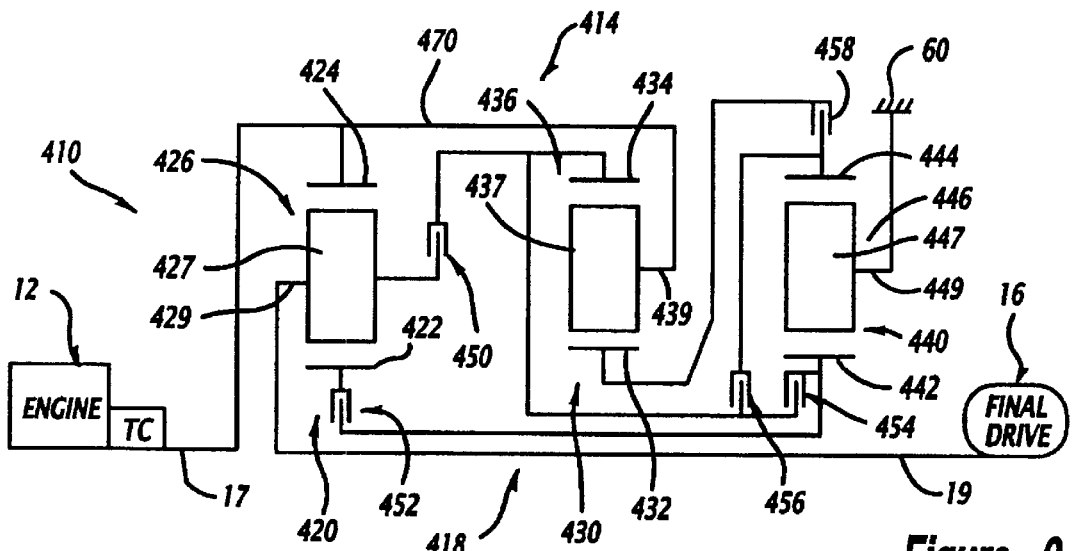
FIG. 9 is a schematic representation of another powertrain having a family member incorporating the present invention.
FIG. 10 is a truth table and chart depicting some of the operating characteristics of the present invention shown in FIG. 9.

A powertrain 410, shown in FIG. 9, includes the conventional engine and torque converter 12, a planetary transmission 414, and the final drive mechanism 16. The planetary transmission 414 includes a planetary gear arrangement 418 having three planetary gearsets 420, 430, and 440, and five torque-transmitting mechanisms 450, 452, 454, 456, and 458.

The five torque-transmitting mechanisms are conventional rotating type torque-transmitting mechanisms, commonly termed clutches. The torque-transmitting mechanisms are preferably fluid-operated electronically controlled friction devices, which are well known in the art of power transmissions.

The planetary gearset 420 includes a sun gear member 422, a ring gear member 424, and a planet carrier assembly member 426. The planet carrier assembly member 426 has a plurality of pinion gears 427 rotatably mounted on a carrier 429 and disposed in meshing relationship with the sun gear member 422 and the ring gear member 424.

The planetary gearset 430 includes a sun gear member 432, a ring gear member 434, and a planet carrier assembly member 436. The planet carrier assembly member 436 has a plurality of pinion gears 437 rotatably mounted on a carrier 439 and disposed in meshing relationship with both the sun gear member 432 and the ring gear member 434.

The planetary gearset 440 includes a sun gear member 442, a ring gear member 444, and planet carrier assembly member 446. The planet carrier assembly member 446 includes a plurality of pinion gears 447 rotatably mounted on a carrier 449 and disposed in meshing relationship with both the sun gear member 442 and the ring gear member 444. Each of the planetary gearsets 420, 430, and 440 are of the simple planetary gearset type wherein a plurality of single pinion gears meshes with both the sun gear member of the planetary gearset and the ring gear member of the planetary gearset.

The ring gear member 424 and planet carrier assembly member 436 are continuously interconnected by an interconnecting member 470 that is continuously connected with the input shaft 17. The output shaft 19 is continuously connected with the planet carrier assembly member 426 and selectively connectible with the ring gear member 434 through the torque-transmitting mechanism 450. The planet carrier assembly member 446 is continuously connected with the transmission housing 60. The sun gear member 422 is selectively connectible with the sun gear member 442 through the torque-transmitting mechanism 452. The ring gear member 434 is selectively connectible with the sun gear member 442 through the torque-transmitting mechanism 454, and selectively connectible with the ring gear member 444 through the torque-transmitting mechanism 456. The sun gear member 432 is selectively connectible with the ring gear member 444 through the torque-transmitting mechanism 458.

As seen in the truth table of FIG. 10, the torque-transmitting mechanisms are selectively engageable in combinations of three to establish six forward speed ratios and one reverse speed ratio between the input shaft 17 and the output shaft 19.

During the reverse speed ratio, the torque-transmitting mechanisms 452, 456, and 458 are engaged. During the reverse speed ratio, the ring gear member 444 is driven at a speed equal to the speed of the input shaft 17. The sun gear members 442 and 422 are driven in reverse at a speed determined by the speed of the ring gear member 444 and the ring gear/sun gear tooth ratio of the planetary gearset 440. The output shaft 19 and planet carrier assembly member 426 are driven in reverse at a speed determined by the speed of the sun gear member 422, the speed of the ring gear member 424, and the ring gear/sun gear tooth ratio of the planetary gearset 420. The numerical value of the reverse speed ratio is determined by the ring gear/sun gear tooth ratios of the planetary gearsets 440 and 420.

The first forward speed ratio is established with the engagement of the torque-transmitting mechanisms 450, 452, and 456. As seen in the truth table of FIG. 10, the torque-transmitting mechanisms 452 and 456 can remain engaged through the neutral condition. During the first forward speed ratio, the sun gear members 422 and 442 are driven forwardly at a speed determined by the speed of the ring gear member 424, the speed of the planet carrier assembly member 426 and the ring gear/sun gear tooth ratio of the planetary gearset 420. The ring gear member 444, the ring gear member 434, planet carrier assembly member 426, and therefore output shaft 19 are driven at a speed determined by the speed of the sun gear member 442 and the ring gear/sun gear tooth ratio of the planetary gearset 440. The numerical value of the first forward speed ratio is determined by the ring gear/sun gear tooth ratios of the planetary gearsets 420 and 440.

The second forward speed ratio is established with the engagement of the torque-transmitting mechanisms 452, 454, and 456. This combination of engagements effectively connects the sun gear member 422 to the transmission housing 60. The planet carrier assembly member 426 and therefore output shaft 19 are driven forwardly at a speed determined by the speed of the ring gear member 424 and ring gear/sun gear tooth ratio of the planetary gearset 420. The numerical value of the second forward speed ratio is determined by the ring gear/sun gear tooth ratio of the planetary gearset 420.

The third forward speed ratio is established with the engagement of the torque-transmitting mechanisms 450, 452, and 454. This combination of the engagements effectively interconnects the planet carrier assembly member 426 and the sun gear member 422 of the planetary gearset 420 so that it rotates as a single unit thereby providing a direct drive between the input shaft 17 and the output shaft 19. The numerical value of the third forward speed ratio is one.

The fourth forward speed ratio is established with the engagement of the torque-transmitting mechanisms 452, 454, and 458. During the fourth forward speed ratio, the sun gear member 432 and ring gear member 444 are rotated at a speed determined by the speed of the input shaft 17, the speed of the ring gear member 434, and the ring gear/sun gear tooth ratio of the planetary gearset 430. The sun gear members 442 and 422 are driven forwardly at a speed determined by the speed of the ring gear member 444 and the ring gear/sun gear tooth ratio of the planetary gearset 440. The planet carrier assembly member 426 and therefore output shaft 19 are driven forwardly at a speed determined by the speed of the ring gear member 424, the speed of the sun gear member 422, and the ring gear/sun gear tooth ratio of the planetary gearset 420. The numerical value of the fourth forward speed ratio is determined by the ring gear/sun gear tooth ratios of all three planetary gearsets 420, 430, and 440.

The fifth forward speed ratio is established with the engagement of the torque-transmitting mechanisms 450, 454, and 458. During the fifth forward speed ratio, the sun gear member 432 and ring gear member 444 are rotated forwardly at a speed determined by the speed of the planet carrier assembly member 436, the speed of the ring gear member 434, and the ring gear/sun gear tooth ratio of the planetary gearset 430. The sun gear member 442, ring gear member 434, and therefore output shaft 19 are driven at a speed determined by the speed of the ring gear member 444 and the ring gear/sun gear tooth ratio of the planetary gearset 440. The numerical value of the fifth forward speed ratio is determined by the ring gear/sun gear tooth ratios of the planetary gearsets 430 and 440.

The sixth forward speed ratio is established with the engagement of the torque-transmitting mechanisms 450, 452, and 458. During the sixth forward speed ratio, the sun gear member 432 and ring gear member 444 are rotated at a speed determined by the speed of the planet carrier assembly member 436, the speed of the ring gear member 434, and the ring gear/sun gear tooth ratio of the planetary gearset 430. The sun gear members 442 and 422 are rotated at a speed determined by the speed of the ring gear member 444 and the ring gear/sun gear tooth ratio of the planetary gearset 440. The planet carrier assembly member 426 and therefore output shaft 19 are driven at a speed determined by the speed of the ring gear member 424, the speed of the sun gear member 422, and the ring gear/sun gear tooth ratio of the planetary gearset 420. The numerical value of the sixth forward speed ratio is determined by the ring gear/sun gear tooth ratios of all three planetary gearsets 420, 430, and 440.

As seen in the truth table and chart of FIG. 10, the single step forward interchanges, as well as the double step forward interchanges, are all single transition type ratio interchanges. Also given in FIG. 10 is an example of the numerical values of the ratios attainable with the planetary gear arrangement 418 as well as the ratio steps between adjacent forward ratios and between the reverse and first forward speed ratio. These numerical values are established utilizing the ring gear/sun gear tooth ratios of the planetary gearsets 420, 430, and 440 as represented by R1/S1, R2/R2, and R3/S3, respectively.

Figures 11, 12:
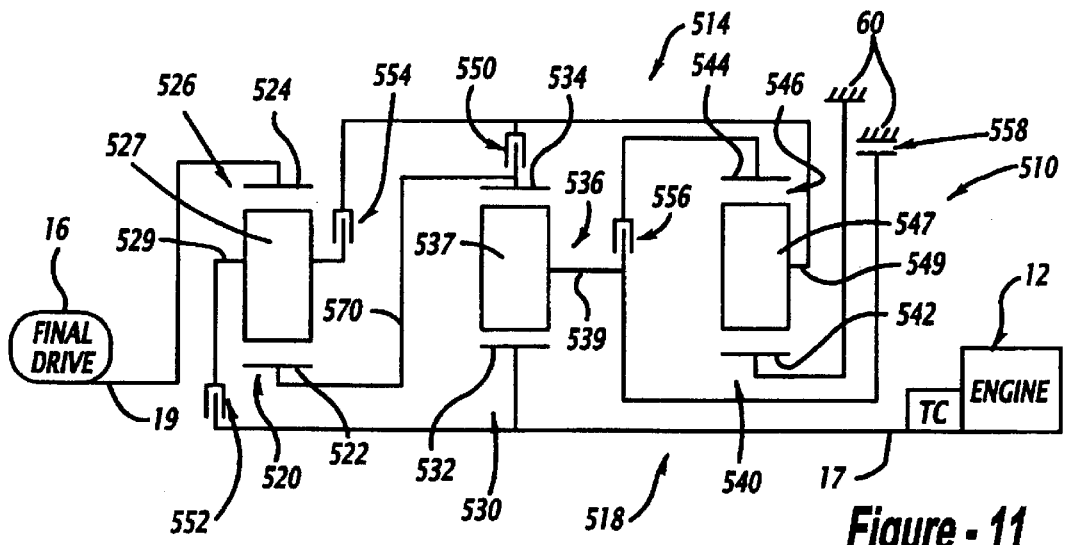
FIG. 11 is a schematic representation of another powertrain having a family member incorporating the present invention.
FIG. 12 is a truth table and chart depicting some of the operating characteristics of the present invention shown in FIG. 11.

A powertrain 510, shown in FIG. 11, includes the conventional engine and torque converter 12, a planetary transmission 514, and the final drive mechanism 16. The planetary transmission 514 includes the input shaft 17, a planetary gear arrangement 518, and the output shaft 19. The planetary gear arrangement 518 includes three planetary gearsets 520, 530, and 540, and five torque-transmitting mechanisms 550, 552, 554, 556, and 558. The torque-transmitting mechanisms 550, 552, 554, and 556 are rotating type torque-transmitting mechanisms, commonly termed clutches; while the torque-transmitting mechanism 558 is a stationary type torque-transmitting mechanism, commonly termed a brake.

The planetary gearset 520 includes a sun gear member 522, a ring gear member 524, and a planet carrier assembly member 526. The planet carrier assembly member 526 has a plurality of pinion gears 527 rotatably mounted on a carrier 529 and disposed in meshing relationship with the sun gear member 522 and the ring gear member 524.

The planetary gearset 530 includes a sun gear member 532, a ring gear member 534, and a planet carrier assembly member 536. The planet carrier assembly member 536 has a plurality of pinion gears 537 rotatably mounted on a carrier 539 and disposed in meshing relationship with both the sun gear member 532 and the ring gear member 534.

The planetary gearset 540 includes a sun gear member 542, a ring gear member 544, and planet carrier assembly member 546. The planet carrier assembly member 546 includes a plurality of pinion gears 547 rotatably mounted on a carrier 549 and disposed in meshing relationship with both the sun gear member 542 and the ring gear member 544. Each of the planetary gearsets 520, 530, and 540 are of the simple planetary gearset type wherein a plurality of single pinion gears meshes with both the sun gear member of the planetary gearset and the ring gear member of the planetary gearset.

The sun gear member 522 and ring gear member 534 are continuously connected with an interconnecting member 570. The input shaft 17 is continuously connected with the sun gear member 532 and selectively connectible with the planet carrier assembly member 526 through the torque-transmitting mechanism 552. The output shaft 19 is continuously connected with the ring gear member 524. The planet carrier assembly member 526 is selectively connectible with the planet carrier assembly member 546 through the torque-transmitting mechanism 554. The interconnecting member 570 is selectively connectible with the planet carrier assembly member 546 through the torque-transmitting mechanism 550. The planet carrier assembly member 536 is selectively connectible with the ring gear member 544 through the torque-transmitting mechanism 556, and is selectively connectible with the transmission housing 60 through the torque-transmitting mechanism 558.

As seen in the truth table of FIG. 12, the torque-transmitting mechanisms are selectively engaged in combinations of three to establish six forward speed ratios and one reverse speed ratio between the input shaft 17 and the output shaft 19.

To establish the reverse speed ratio, the torque-transmitting mechanisms 550, 554, and 558 are engaged. The ring gear member 534 is effectively connected directly with the output shaft 19 and is driven at a speed determined by the speed of the sun gear member 532 and the ring gear/sun gear tooth ratio of the planetary gearset 530. The numerical value of the reverse speed ratio is determined by the ring gear/sun gear tooth ratio of the planetary gearset 530.

The first forward speed ratio is established with the engagement of the torque-transmitting mechanism 554, 556, and 558. It should be noted that the torque-transmitting mechanisms 554 and 558 can remain engaged through a neutral condition. During the first forward speed ratio, the planet carrier assembly members 536 and 526 are held stationary. The ring gear member 534 and sun gear member 522 are rotated at a speed determined by the speed of the sun gear member 532 and the ring gear/sun gear tooth ratio of the planetary gearset 530. The ring gear member 524 and therefore output shaft 19 are rotated at a speed determined by the speed of the sun gear member 522 and the ring gear/sun gear tooth ratio of the planetary gearset 520. The numerical value of the first forward speed ratio is determined by the ring gear/sun gear tooth ratios of the planetary gearsets 520 and 530.

The second forward speed ratio is established with the engagement of the torque-transmitting mechanisms 550, 554, and 556. During the second forward speed ratio, the planet carrier assembly member 536 and ring gear member 544 are driven forwardly at a speed determined by the speed of the sun gear member 532, the speed of the ring gear member 534, and the ring gear/sun gear tooth ratio of the planetary gearset 530. The planet carrier assembly member 546, ring gear member 534, planetary gearset 520, and the output shaft 19 are rotated at a speed determined by the speed of the ring gear member 544 and the ring gear/sun gear tooth ratio of the planetary gearset 540. The numerical value of the second forward speed ratio is determined by the ring gear/sun gear tooth ratios of the planetary gearsets 530 and 540.

The third forward speed ratio is established with the engagement of the torque-transmitting mechanisms 552, 554, and 556. During the third forward speed ratio, the planet carrier assembly member 526 and planet carrier assembly member 546 are driven by the input shaft 17. The ring gear member 544 and planet carrier assembly member 536 are driven at a speed determined by the speed of the planet carrier assembly member 546 and the ring gear/sun gear tooth ratio of the planetary gearset 540. The ring gear member 534 and sun gear member 522 are driven forwardly at a speed determined by the speed of the sun gear member 532, the speed of the planet carrier assembly member 536, and the ring gear/sun gear tooth ratio of planetary gearset 530. The ring gear member 524 and therefore output shaft 19 are driven at a speed determined by the speed of the sun gear member 522, the speed of the planet carrier assembly member 526, and the ring gear/sun gear tooth ratio of the planetary gearset 520. The numerical value of the third forward speed ratio is determined by the ring gear/sun gear tooth ratios of all three planetary gearsets 520, 530, and 540.

The fourth forward speed ratio is established with the engagement of the torque-transmitting mechanisms 550, 552, and 554. With this combination of engagements, the sun gear member 522 and planet carrier assembly member 546, and therefore ring gear member 524 are rotated in unison with the input shaft 17. The fourth forward speed ratio is a direct drive having a numerical value of one.

The fifth forward speed ratio is established with the engagement of the torque-transmitting mechanisms 550, 552, and 556. During the fifth forward speed ratio, the planet carrier assembly member 536 and ring gear member 544 are driven forwardly at a speed determined by the speed of the sun gear member 532, the speed of the ring gear member 534, and the ring gear/sun gear tooth ratio of the planetary gearset 530. The planet carrier assembly member 546, ring gear member 534, and sun gear member 522 are driven at a speed determined by the speed of the ring gear member 544 and the ring gear/sun gear tooth ratio of the planetary gearset 540. The ring gear member 524 and therefore output shaft 19 are driven at a speed determined by the speed of the sun gear member 522, the speed of the planet carrier assembly member 526, and the ring gear/sun gear tooth ratio of the planetary gearset 520. The numerical value of the fifth forward speed ratio is determined by the ring gear/sun gear tooth ratios of the planetary gearsets 520, 530, and 540.

The sixth forward speed ratio is established with the engagement of the torque-transmitting mechanisms 550, 552, and 558. The ring gear member 534 and sun gear member 522 are driven at a speed determined by the speed determined by the speed of the sun gear member 532 and ring gear/sun gear tooth ratio of the planetary gearset 530. The ring gear member 524 and therefore output shaft 19 are driven at a speed determined by the speed of the sun gear member 522, the speed of the planet carrier assembly member 526, and the ring gear/sun gear tooth ratio of the planetary gearset 520. The numerical value of the sixth forward speed ratio is determined by the ring gear/sun gear tooth ratios of the planetary gearsets 520 and 530.

The truth table shown in FIG. 12 describes the engagement sequence and combinations utilized above to describe the speed ratios. The truth table also provides an example of the numerical speed ratios for the planetary gear arrangement 518 when utilizing the ring gear/sun gear tooth ratios given as R1/S1, R2/S2, and R3/S3 representing the values of the ring gear/sun gear tooth ratios of the planetary gearsets 520, 530, and 540. It will be noted that the planetary gear arrangement 518 in utilizing these ring gear/sun gear tooth ratios provides three underdrives, a direct drive, and two overdrives in the forward direction. FIG. 12 also sets forth the ratio steps between adjacent forward speed ratios as well as the reverse-to-first interchange. It should be noted from the truth table, that all of the single step forward interchanges are single transition interchanges and each of the forward double step interchanges are single transition interchanges.

Figures 13, 14:
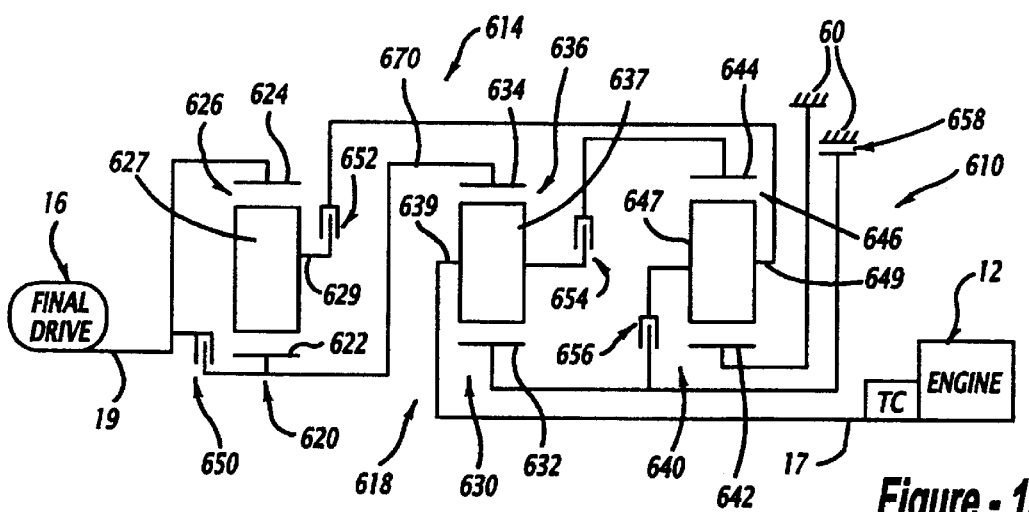
FIG. 13 is a schematic representation of another powertrain having a family member incorporating the present invention.
FIG. 14 is a truth table and chart depicting some of the operating characteristics of the present invention shown in FIG. 13.

A powertrain 610, shown in FIG. 13, includes the conventional engine and torque converter 12, a planetary transmission 614, and the final drive mechanism 16. The planetary transmission 614 includes the input shaft 17, a planetary gear arrangement 618, and the output shaft 19. The planetary gear arrangement 618 includes three planetary gearsets 620, 630, and 640, and five torque-transmitting mechanisms 650, 652, 654, 656, and 658. The torque-transmitting mechanisms 650, 652, 654, and 656 are rotating type torque-transmitting mechanisms, commonly termed clutches; while the torque-transmitting mechanism 658 is a stationary type torque-transmitting mechanism, commonly termed a brake.

The planetary gearset 620 includes a sun gear member 622, a ring gear member 624, and a planet carrier assembly member 626. The planet carrier assembly member 626 has a plurality of pinion gears 627 rotatably mounted on a carrier 629 and disposed in meshing relationship with the sun gear member 622 and the ring gear member 624.

The planetary gearset 630 includes a sun gear member 632, a ring gear member 634, and a planet carrier assembly member 636. The planet carrier assembly member 636 has a plurality of pinion gears 637 rotatably mounted on a carrier 639 and disposed in meshing relationship with both the sun gear member 632 and the ring gear member 634.

The planetary gearset 640 includes a sun gear member 642, a ring gear member 644, and planet carrier assembly member 646. The planet carrier assembly member 646 includes a plurality of pinion gears 647 rotatably mounted on a carrier 649 and disposed in meshing relationship with both the sun gear member 642 and the ring gear member 644. Each of the planetary gearsets 620, 630, and 640 are of the simple planetary gearset type wherein a plurality of single pinion gears meshes with both the sun gear member of the planetary gearset and the ring gear member of the planetary gearset.

The sun gear member 622 and ring gear member 634 are continuously interconnected by an interconnecting member 670, which is also selectively connectible with the output shaft 19 through the torque-transmitting mechanism 650. The input shaft 17 is continuously connected with the planet carrier assembly member 636 and selectively connectible with the ring gear member 644 through the torque-transmitting mechanism 654. The ring gear member 624 is continuously connected with the output shaft 19. The sun gear member 642 is continuously connected with the transmission housing 60. The planet carrier assembly member 626 is selectively connectible with the planet carrier assembly member 646 through the torque-transmitting mechanism 652. The sun gear member 632 is selectively connectible with the planet carrier assembly member 646 through the torque-transmitting mechanism 656, and selectively connectible with the transmission housing 60 through the torque-transmitting mechanism 658.

As seen in FIG. 14, the torque-transmitting mechanisms are engaged in combinations of three to establish six forward speed ratios and one reverse speed ratio between the input shaft 17 and the output shaft 19. A neutral condition is also present in which the torque-transmitting mechanisms 658 and 652 can remain engaged to simplify the forward/reverse interchange. FIG. 14 also provides an example of ring gear/sun gear tooth ratios described as R1/S1, R2/S2, and R3/S3, which represents the ring gear/sun gear tooth ratios of the planetary gearsets 620, 630, and 640, respectively. These ring gear/sun gear tooth ratios are utilized to determine or calculate the ratios given for each of the speed ratios in the truth table. The ratio steps between adjacent ratios in the forward direction, as well as the reverse-to-first ratio step, are given in FIG. 14.

Those skilled in the art will recognize that the numerical value of the reverse speed ratio is determined utilizing the ring gear/sun gear tooth ratios of the planetary gearsets 620 and 630. The numerical value of the first and second forward speed ratios is determined utilizing the ring gear/sun gear tooth ratios of all three planetary gearsets 620, 630, and 640. The numerical value of the third forward speed ratio is determined utilizing the ring gear/sun gear tooth ratio of the planetary gearset 640. The fourth forward speed ratio is a direct drive having a numerical value of one. The fifth forward speed ratio has a numerical value determined utilizing the ring gear/sun gear tooth ratios of the planetary gearsets 630 and 640. The sixth forward speed ratio has a numerical value determined utilizing the ring gear/sun gear tooth ratio of the planetary gearset 630.

Figures 15, 16:
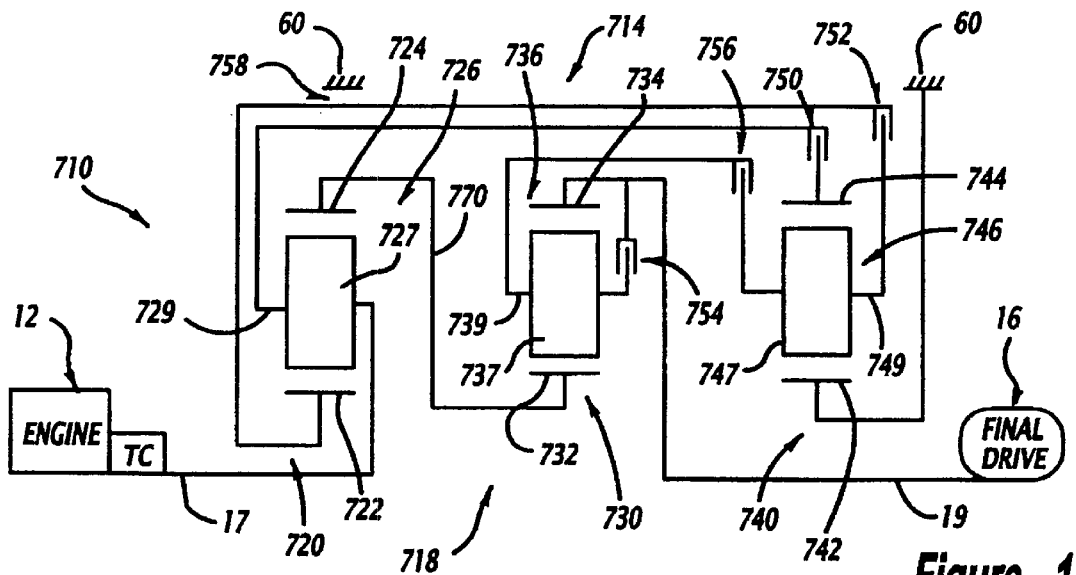
FIG. 15 is a schematic representation of another powertrain having a family member incorporating the present invention.
FIG. 16 is a truth table and chart depicting some of the operating characteristics of the present invention shown in FIG. 15.

A powertrain 710, shown in FIG. 15, includes the conventional engine and torque converter 12, a planetary transmission 714, and the final drive mechanism 16. The planetary transmission 714 includes the input shaft 17, a planetary gear arrangement 718, and the output shaft 19. The planetary gear arrangement 718 includes three planetary gearsets 720, 730, and 740, and five torque-transmitting mechanisms 750, 752, 754, 756, and 758. The torque-transmitting mechanisms 750, 752, 754, and 756 are rotating type torque-transmitting mechanisms, commonly termed clutches; while the torque-transmitting mechanism 758 is a stationary type torque-transmitting mechanism, commonly termed a brake.

The planetary gearset 720 includes a sun gear member 722, a ring gear member 724, and a planet carrier assembly member 726. The planet carrier assembly member 726 has a plurality of pinion gears 727 rotatably mounted on a carrier 729 and disposed in meshing relationship with the sun gear member 722 and the ring gear member 724.

The planetary gearset 730 includes a sun gear member 732, a ring gear member 734, and a planet carrier assembly member 736. The planet carrier assembly member 736 has a plurality of pinion gears 737 rotatably mounted on a carrier 739 and disposed in meshing relationship with both the sun gear member 732 and the ring gear member 734.

The planetary gearset 740 includes a sun gear member 742, a ring gear member 744, and planet carrier assembly member 746. The planet carrier assembly member 746 includes a plurality of pinion gears 747 rotatably mounted on a carrier 749 and disposed in meshing relationship with both the sun gear member 742 and the ring gear member 744. Each of the planetary gearsets 720, 730, and 740 are of the simple planetary gearset type wherein a plurality of single pinion gears meshes with both the sun gear member of the planetary gearset and the ring gear member of the planetary gearset.

The ring gear member 724 and sun gear member 732 are continuously interconnected by an interconnecting member 770. The input shaft 17 is continuously connected with the planet carrier assembly member 726 and selectively connectible with the ring gear member 744 through the torque-transmitting mechanism 750. The output shaft 19 is continuously connected with the ring gear member 734 and selectively connectible with the planet carrier assembly member 736 through the torque-transmitting mechanism 754. The sun gear member 742 is continuously connected with the transmission housing 60. The planet carrier assembly member 746 is selectively connectible with the planet carrier assembly member 736 through the torque-transmitting mechanism 756 and selectively connectible with the sun gear member 722 through the torque-transmitting mechanism 752. The sun gear member 722 is selectively connectible with the transmission housing 60 through the torque-transmitting mechanism 758.

The truth table and chart shown in FIG. 16 provide a description of the engagement combination and sequence of the torque-transmitting mechanisms to establish six forward speed ratios and one reverse speed ratio between the input shaft 17 and the output shaft 19. The truth table also provides an example of numerical values for speed ratios which are determined utilizing the ring gear/sun gear tooth ratios of the planetary gearsets 720, 730, and 740 given as R1/S1, R2/S2, and R3/S3, respectively. Also given in FIG. 16 is an example of the ratio steps when the given numerical values are utilized.

Those skilled in the art will recognize that the reverse speed ratio has a numerical value determined utilizing the ring gear/sun gear tooth ratios of the planetary gearsets 720 and 730. The first and second forward speed ratios have numerical values determined utilizing the ring gear/sun gear tooth ratios of the planetary gearsets 720, 730, and 740. The third forward speed ratio has a numerical value determined utilizing the ring gear/sun gear tooth ratio of the planetary gearset 740. The fourth forward speed ratio is a direct drive having a numerical value of one. The fifth forward speed ratio has a numerical value determined utilizing the ring gear/sun gear tooth ratios of the planetary gearsets 720 and 740. The sixth forward speed ratio has a numerical value determined utilizing the ring gear/sun gear tooth ratio of the planetary gearset 720.

Figures 17, 18:
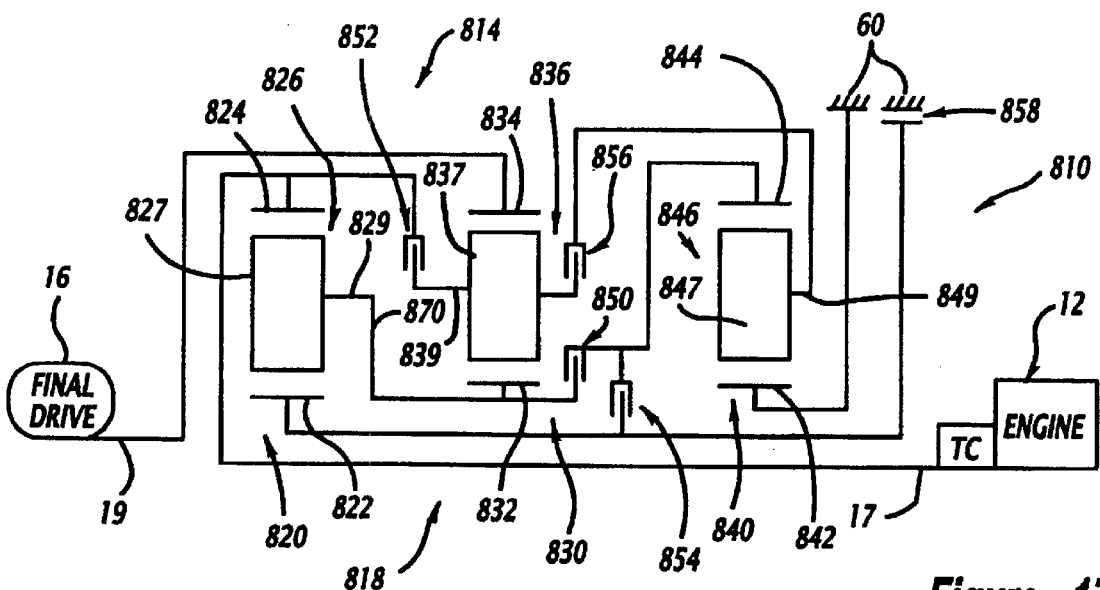
FIG. 17 is a schematic representation of another powertrain having a family member incorporating the present invention.
FIG. 18 is a truth table and chart depicting some of the operating characteristics of the present invention shown in FIG. 17.

A powertrain 810, shown in FIG. 17, includes the conventional engine and torque converter 12, a planetary transmission 814, and a final drive mechanism 16. The planetary transmission 814 includes the input shaft 17, a planetary gear arrangement 818, and the output shaft 19. The planetary gear arrangement 818 includes three planetary gearsets 820, 830, and 840, and five torque-transmitting mechanisms 850, 852, 854, 856, and 858. The torque-transmitting mechanisms 850, 852, 854, and 856 are rotating type torque-transmitting mechanisms, commonly termed clutches; while the torque-transmitting mechanism 858 is a stationary type torque-transmitting mechanism, commonly termed a brake.

The planetary gearset 820 includes a sun gear member 822, a ring gear member 824, and a planet carrier assembly member 826. The planet carrier assembly member 826 has a plurality of pinion gears 827 rotatably mounted on a carrier 829 and disposed in meshing relationship with the sun gear member 822 and the ring gear member 824.

The planetary gearset 830 includes a sun gear member 832, a ring gear member 834, and a planet carrier assembly member 836. The planet carrier assembly member 836 has a plurality of pinion gears 837 rotatably mounted on a carrier 839 and disposed in meshing relationship with both the sun gear member 832 and the ring gear member 834.

The planetary gearset 840 includes a sun gear member 842, a ring gear member 844, and planet carrier assembly member 846. The planet carrier assembly member 846 includes a plurality of pinion gears 847 rotatably mounted on a carrier 849 and disposed in meshing relationship with both the sun gear member 842 and the ring gear member 844. Each of the planetary gearsets 820, 830, and 840 are of the simple planetary gearset type wherein a plurality of single pinion gears meshes with both the sun gear member of the planetary gearset and the ring gear member of the planetary gearset.

The planet carrier assembly member 826 and sun gear member 832 are continuously interconnected with an interconnecting member 870. The input shaft 17 is continuously connected with the ring gear member 824 and selectively connectible with the planet carrier assembly member 836 through the torque-transmitting mechanism 852. The output shaft 19 is continuously connected with the ring gear member 834. The sun gear member 842 is continuously connected with the transmission housing 60. The sun gear member 822 is selectively connectible with the ring gear member 844 through the torque-transmitting mechanism 854, and is selectively connectible with the transmission housing 60 through the torque-transmitting mechanism 858. The interconnecting member 870 is selectively connectible with the ring gear member 844 through the torque-transmitting mechanism 850. The planet carrier assembly member 836 is selectively connectible with the planet carrier assembly member 846 through the torque-transmitting mechanism 856.

The truth table and chart in FIG. 17 describe the sequence and combination of engagements for the torque-transmitting mechanisms to establish six forward speed ratios and one reverse speed ratio between the input shaft 17 and the output shaft 19. The truth table also provides an example of numerical values for the speed ratios. These numerical values have been established utilizing the ring gear/sun gear tooth ratios of the planetary gearsets 820, 830, and 840 as represented by the ring gear/sun gear tooth ratios R1/S1, R2/S2, and R3/S3, respectively. Also given in FIG. 18 are the ratio steps between adjacent forward speed ratios as well as between the reverse and first speed ratio when the numerical values for the speeds ratios is utilized.

Those skilled in the art will recognize that the numerical value for the reverse speed ratio is determined utilizing the ring gear/sun gear tooth ratios of the planetary gearsets 820 and 830. The numerical value for the first forward speed ratio is determined utilizing the ring gear/sun gear tooth ratios of all three planetary gearsets 820, 830, and 840. The second and third forward speed ratios have numerical values determined utilizing the ring gear/sun gear tooth ratios of the planetary gearsets 830 and 840. The fourth forward speed ratio has a numerical value determined utilizing the ring gear/sun gear tooth ratios of all three planetary gearsets 820, 830, and 840. The fifth forward speed ratio is a direct drive having a numerical value of one. The six forward speed ratio has a numerical value determined utilizing the ring gear/sun gear tooth ratios of the planetary gearsets 820 and 830.

Figures 19, 20:
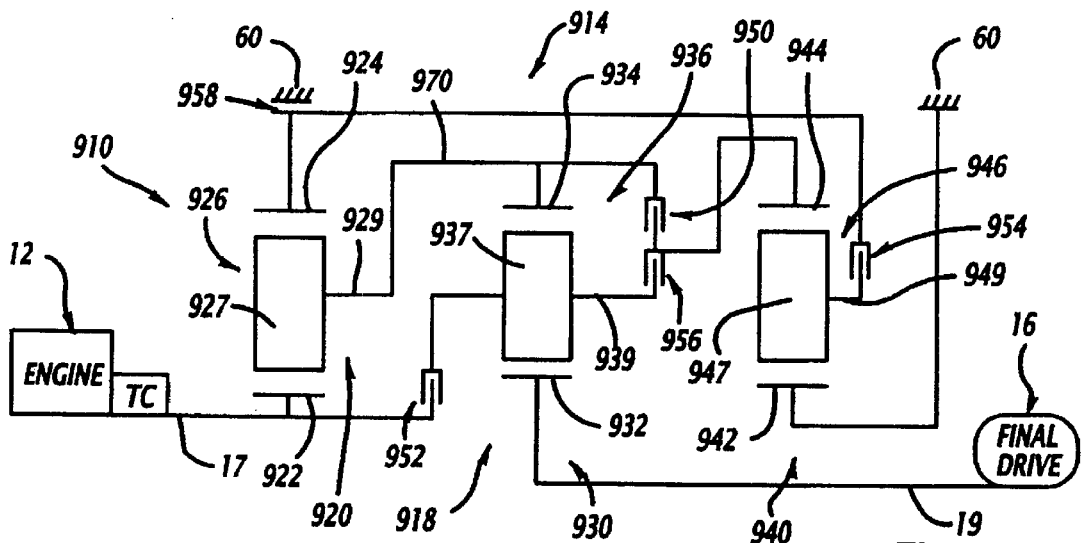
FIG. 19 is a schematic representation of another powertrain having a family member incorporating the present invention.
FIG. 20 is a truth table and chart depicting some of the operating characteristics of the present invention shown in FIG. 19.

A powertrain 910, shown in FIG. 19, includes the conventional engine and torque converter 12, a planetary transmission 914, and the final drive mechanism 16. The planetary transmission 914 includes a planetary gear arrangement 918, the input shaft 17, and the output shaft 19. The planetary gear arrangement 918 includes three planetary gearsets 920, 930, and 940, and five torque-transmitting mechanisms 950, 952, 954, 956, and 958. The torque-transmitting mechanisms 950, 952, 954, and 956 are rotating type torque-transmitting mechanisms, commonly termed clutches; while the torque-transmitting mechanism 958 is a stationary type torque-transmitting mechanism, commonly termed a brake.

The planetary gearset 920 includes a sun gear member 922, a ring gear member 924, and a planet carrier assembly member 926. The planet carrier assembly member 926 has a plurality of pinion gears 927 rotatably mounted on a carrier 929 and disposed in meshing relationship with the sun gear member 922 and the ring gear member 924.

The planetary gearset 930 includes a sun gear member 932, a ring gear member 934, and a planet carrier assembly member 936. The planet carrier assembly member 936 has a plurality of pinion gears 937 rotatably mounted on a carrier 939 and disposed in meshing relationship with both the sun gear member 932 and the ring gear member 934.

The planetary gearset 940 includes a sun gear member 942, a ring gear member 944, and planet carrier assembly member 946. The planet carrier assembly member 946 includes a plurality of pinion gears 947 rotatably mounted on a carrier 949 and disposed in meshing relationship with both the sun gear member 942 and the ring gear member 944. Each of the planetary gearsets 920, 930, and 940 are of the simple planetary gearset type wherein a plurality of single pinion gears meshes with both the sun gear member of the planetary gearset and the ring gear member of the planetary gearset.

The planet carrier assembly member 926 and ring gear member 934 are continuously interconnected by an interconnecting an interconnecting member 970 which is selectively connectible with the ring gear member 944 through the torque-transmitting mechanism 950. The input shaft 17 is continuously connected with the sun gear member 922 and selectively connectible with the planet carrier assembly member 936 through the torque-transmitting mechanism 952. The output shaft 19 is continuously connected with the sun gear member 932. The sun gear member 942 is continuously connected with the transmission housing 60. The ring gear member 924 is selectively connectible with the transmission 60 through the torque-transmitting mechanism 958 and selectively connectible with the planet carrier assembly member 946 through the torque-transmitting mechanism 954. The planet carrier assembly member 936 is selectively connectible with the ring gear member 944 through the torque-transmitting mechanism 956.

The truth table and chart of FIG. 20 describe the engagement combination and sequence utilized with the torque-transmitting mechanisms to establish six forward speed ratios and one reverse speed ratio in the planetary gear arrangement 918 between the input shaft 17 and the output shaft 19. The truth table also provides an example of numerical values of speed ratios that can be attained with the planetary gear arrangement 918 when the ring gear/sun gear tooth ratios utilized for planetary gearsets 920, 930, and 940 are established utilizing the ring gear/sun gear tooth ratio values are represented as R1/S1, R2/S2, and R3/S3, respectively. Also provided in the chart of FIG. 20 is the ratio steps between adjacent forward speed ratios and between the reverse and first speed ratio when the given numerical values of the speed ratios are employed.

Those skilled in the art will recognize that the reverse speed ratio is determined utilizing the ring gear/sun gear tooth ratios of planetary gearsets 920 and 930. The numerical value of the first forward speed ratio is determined utilizing the ring gear/sun gear tooth ratio of the planetary gearset 920. The numerical value of the second forward speed ratio is determined utilizing the ring gear/sun gear tooth ratios of the planetary gearsets 920 and 940. The third forward speed ratio is a direct drive having a numerical value of one. The numerical values of the fourth and fifth forward speed ratios are determined utilizing the ring gear/sun gear tooth ratios of all three planetary gearsets 920, 930, and 940. The numerical value of the sixth forward speed ratio is determined utilizing the ring gear/sun gear tooth ratios of the planetary gearsets 920 and 930.

Figures 21, 22:
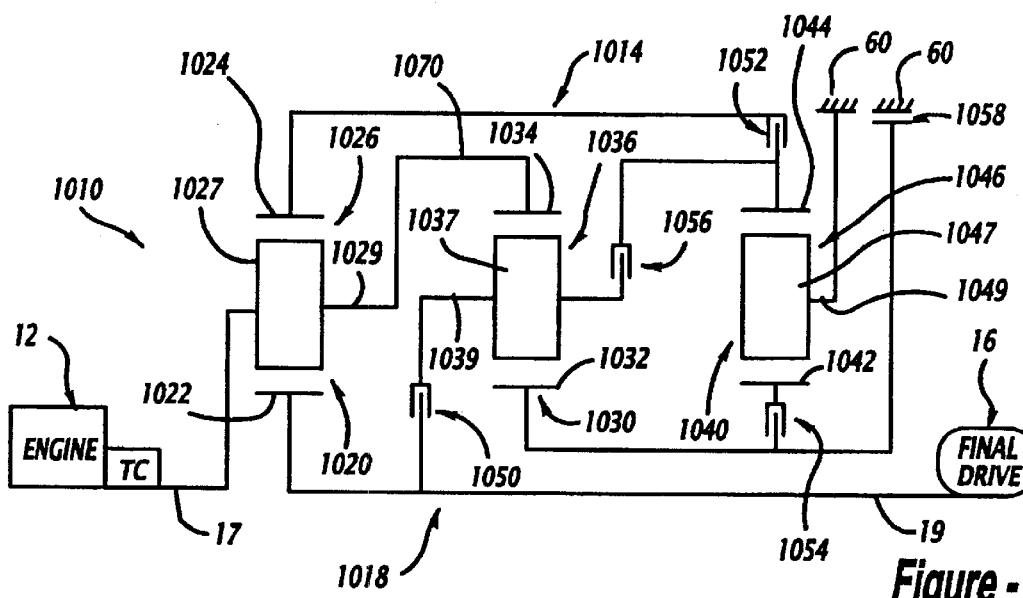
FIG. 21 is a schematic representation of another powertrain having a family member incorporating the present invention.
FIG. 22 is a truth table and chart depicting some of the operating characteristics of the present invention shown in FIG. 21.

A powertrain 1010, shown in FIG. 21, includes the conventional engine and torque converter 12, a planetary transmission 1014, and the final drive mechanism 16. The planetary transmission 1014 includes the input shaft 17, a planetary gear arrangement 1018, and the output shaft 19. The planetary gear arrangement 1018 includes three planetary gearsets 1020, 1030, and 1040, and five torque-transmitting mechanisms 1050, 1052, 1054, 1056, and 1058. The torque-transmitting mechanisms 1050, 1052, 1054, and 1056 are rotating type torque-transmitting mechanisms, commonly termed clutches; while the torque-transmitting mechanism 1058 is a stationary type torque-transmitting mechanism, commonly termed a brake.

The planetary gearset 1020 includes a sun gear member 1022, a ring gear member 1024, and a planet carrier assembly member 1026. The planet carrier assembly member 1026 has a plurality of pinion gears 1027 rotatably mounted on a carrier 1029 and disposed in meshing relationship with the sun gear member 1022 and the ring gear member 1024.

The planetary gearset 1030 includes a sun gear member 1032, a ring gear member 1034, and a planet carrier assembly member 1036. The planet carrier assembly member 1036 has a plurality of pinion gears 1037 rotatably mounted on a carrier 1039 and disposed in meshing relationship with both the sun gear member 1032 and the ring gear member 1034.

The planetary gearset 1040 includes a sun gear member 1042, a ring gear member 1044, and planet carrier assembly member 1046. The planet carrier assembly member 1046 includes a plurality of pinion gears 1047 rotatably mounted on a carrier 1049 and disposed in meshing relationship with both the sun gear member 1042 and the ring gear member 1044. Each of the planetary gearsets 1020, 1030, and 1040 are of the simple planetary gearset type wherein a plurality of single pinion gears meshes with both the sun gear member of the planetary gearset and the ring gear member of the planetary gearset.

The planet carrier assembly member 1026 and ring gear member 1034 are continuously interconnected by an interconnecting member 1070 which is also continuously connected with the input shaft 17. The output shaft 19 is continuously connected with the sun gear member 1022 and selectively connectible with the planet carrier assembly member 1036 through the torque transmitting mechanism 1050. The ring gear member 1044 is selectively connectible with the ring gear member 1024 through the torque-transmitting mechanism 1052. The planet carrier assembly member 1046 is continuously connected with the transmission housing 60. The planet carrier assembly member 1036 is selectively connectible with the ring gear member 1044 through the torque-transmitting mechanism 1056. The sun gear member 1032 is selectively connectible with the sun gear member 1042 through the torque-transmitting mechanism 1054, and selectively connectible with the transmission housing 60 through the torque-transmitting mechanism 1058.

The truth table of FIG. 22 describes the engagement combinations and sequence to establish the six forward speed ratios and one reverse speed ratio between the input shaft 17 and the output shaft 19. The truth table also provides an example of numerical values for the speed ratios that are determined utilizing the ring gear/sun gear tooth ratios of the planetary gearsets 1020, 1030, and 1040, which are represented in FIG. 22 as R1/S1, R2/S2, and R3/S3, respectively. Also given in FIG. 22 is a chart providing the ratio steps between adjacent forward speed ratios as well and the reverse-to-first speed ratio.

Those skilled in the art will recognize that the numerical value of the reverse speed ratio is determined utilizing the ring gear/sun gear tooth ratios of all three planetary gearsets 1020, 1030, and 1040. The first forward speed ratio has a numerical value determined utilizing the ring gear/sun gear tooth ratios of the planetary gearsets 1030 and 1040. The second forward speed ratio has a numerical value determined utilizing the ring gear/sun gear tooth ratio of the planetary gearset 1030. The third forward speed ratio is a direct drive having a numerical value of one. The fourth forward speed ratio has a numerical value determined utilizing the ring gear/sun gear tooth ratios of the planetary gearsets 1020 and 1030. The fifth forward speed ratio has a numerical value determined utilizing the ring gear/sun gear tooth ratios of all three planetary gearsets 1020, 1030, and 1040. The sixth forward speed ratio has a numerical value determined utilizing the ring gear/sun gear tooth ratio of the planetary gearset 1020.

Figures 23, 24:
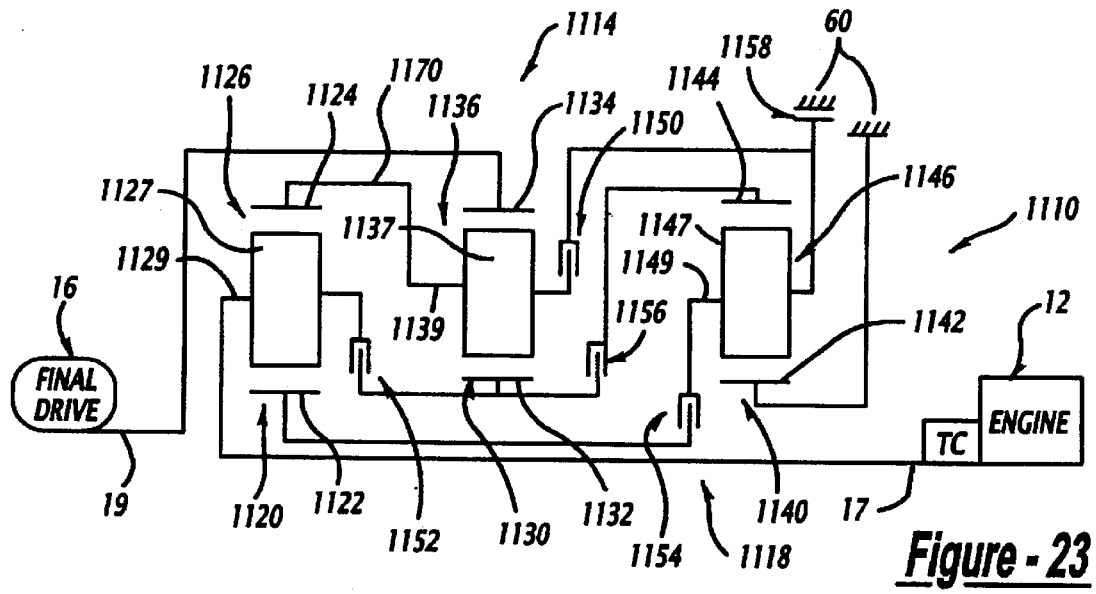
FIG. 23 is a schematic representation of another powertrain having a family member incorporating the present invention.
FIG. 24 is a truth table and chart depicting some of the operating characteristics of the present invention shown in FIG. 23.

A powertrain 1110, shown in FIG. 23, includes the conventional engine and torque converter 12, a planetary transmission 1114, and the final drive mechanism 16. The planetary transmission 1114 includes the input shaft 17, a planetary gear arrangement 1118, and the output shaft 19. The planetary gear arrangement 1118 includes three planetary gearsets 1120, 1130, and 1140, and five torque-transmitting mechanisms 1150, 1152, 1154, 1156, and 1158. The torque-transmitting mechanisms 1150, 1152, 1154, and 1156 are rotating type torque-transmitting mechanisms, commonly termed clutches; while the torque-transmitting mechanism 1158 is a stationary type torque-transmitting mechanism, commonly termed a brake.

The planetary gearset 1120 includes a sun gear member 1122, a ring gear member 1124, and a planet carrier assembly member 1126. The planet carrier assembly member 1126 has a plurality of pinion gears 1127 rotatably mounted on a carrier 1129 and disposed in meshing relationship with the sun gear member 1122 and the ring gear member 1124.

The planetary gearset 1130 includes a sun gear member 1132, a ring gear member 1134, and a planet carrier assembly member 1136. The planet carrier assembly member 1136 has a plurality of pinion gears 1137 rotatably mounted on a carrier 1139 and disposed in meshing relationship with both the sun gear member 1132 and the ring gear member 1134.

The planetary gearset 1140 includes a sun gear member 1142, a ring gear member 1144, and planet carrier assembly member 1146. The planet carrier assembly member 1146 includes a plurality of pinion gears 1147 rotatably mounted on a carrier 1149 and disposed in meshing relationship with both the sun gear member 1142 and the ring gear member 1144. Each of the planetary gearsets 1120, 1130, and 1140 are of the simple planetary gearset type wherein a plurality of single pinion gears meshes with both the sun gear member of the planetary gearset and the ring gear member of the planetary gearset.

The ring gear member 1124 and planet carrier assembly member 1136 are continuously interconnected by an interconnecting member 1170. The input shaft 17 is continuously connected with the planet carrier assembly member 1126 and selectively connectible with the sun gear member 1132 through the torque transmitting mechanism 1152. The output shaft 19 is continuously connected with the ring gear 1134. The sun gear member 1142 is continuously connected with the transmission housing 60. The sun gear member 1132 is selectively connectible with the ring gear member 1144 through the torque-transmitting mechanism 1156. The planet carrier assembly member 1146 is selectively connectible with the sun gear member 1122 through the torque-transmitting mechanism 1154, selectively connectible with the interconnecting member 1170 through the torque-transmitting mechanism 1150, and selectively connectible with the transmission housing 60 through the torque-transmitting mechanism 1158.

The truth table and chart shown in FIG. 24 describe the engagement combination and sequence for the torque-transmitting mechanisms in order to establish six forward speed ratios and one reverse speed ratio between the input shaft 17 and the output shaft 19 through the planetary gear arrangement 1118. The truth table provides an example of numerical values for each of the speed ratios. These numerical values are determined utilizing the ring gear/sun gear tooth ratios of the planetary gearsets 1120, 1130, and 1140 as represented by the ring gear/sun gear tooth ratios R1/S1, R2/S2, and R3/S3, respectively. Also given in the chart of FIG. 24 is a chart of the ratio steps between adjacent speed ratios as well as the reverse-to-first forward speed ratio step.

Those skilled in the art will recognize that the reverse speed ratio has a numerical value determined utilizing the ring gear/sun gear tooth ratio of the planetary gearset 1130. The first and second forward speed ratios have numerical values determined utilizing the ring gear/sun gear tooth ratios of the planetary gearsets 1130 and 1140. The third forward speed ratio is a direct drive having a numerical value of one. The fourth forward speed ratio has a numerical value determined utilizing the ring gear/sun gear tooth ratios of all three planetary gearsets 1120, 1130, and 1140. The fifth and sixth forward speed ratios have numerical values determined utilizing the ring gear/sun gear tooth ratios of the planetary gearsets 1120 and 1130.

Figures 25, 26:
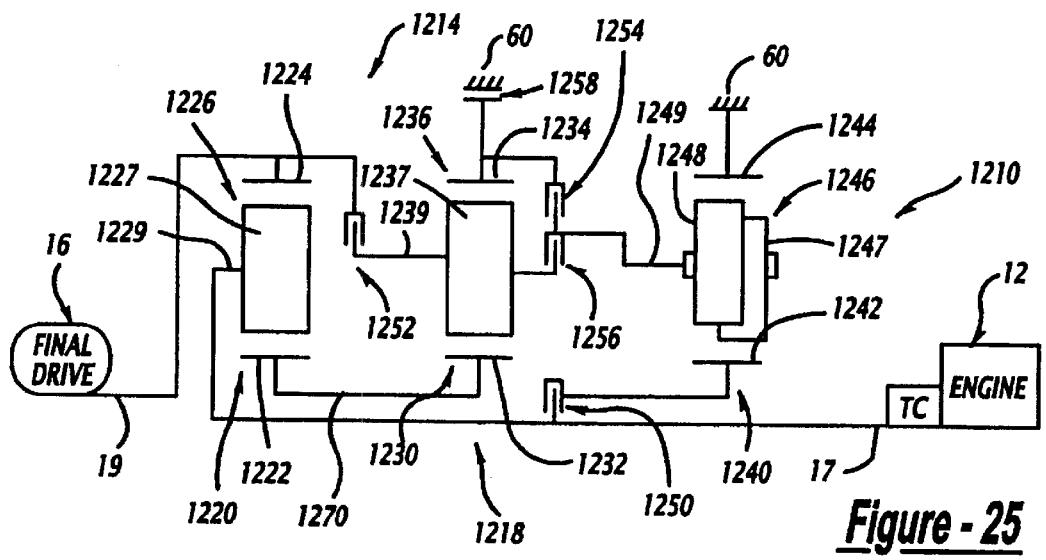
FIG. 25 is a schematic representation of another powertrain having a family member incorporating the present invention.
FIG. 26 is a truth table and chart depicting some of the operating characteristics of the present invention shown in FIG. 25.

A powertrain 1210, shown in FIG. 25, includes the conventional engine and torque converter 12, a planetary transmission 1214, and the final drive mechanism 16. The planetary transmission 1214 includes the input shaft 17, a planetary gear arrangement 1218, and the output shaft 19. The planetary gear arrangement 1218 includes three planetary gearsets 1220, 1230, and 1240, and five torque-transmitting mechanisms 1250, 1252, 1254, 1256, and 1258. The torque-transmitting mechanisms 1250, 1252, 1254, and 1256 are rotating type torque-transmitting mechanisms, commonly termed clutches; while the torque-transmitting mechanism 1258 is a stationary type torque-transmitting mechanism, commonly termed a brake.

The planetary gearset 1220 includes a sun gear member 1222, a ring gear member 1224, and a planet carrier assembly member 1226. The planet carrier assembly member 1226 has a plurality of pinion gears 1227 rotatably mounted on a carrier 1229 and disposed in meshing relationship with the sun gear member 1222 and the ring gear member 1224.

The planetary gearset 1230 includes a sun gear member 1232, a ring gear member 1234, and a planet carrier assembly member 1236. The planet carrier assembly member 1236 has a plurality of pinion gears 1237 rotatably mounted on a carrier 1239 and disposed in meshing relationship with both the sun gear member 1232 and the ring gear member 1234.

The planetary gearset 1240 includes a sun gear member 1242, a ring gear member 1244, and a planet carrier assembly member 1246 which includes a plurality of intermeshing pinion gears 1247 and 1248 rotatably mounted on a carrier 1249 and disposed in meshing relationship with the sun gear member 1242 and the ring gear member 1244, respectively.

The sun gear members 1222 and 1232 are continuously interconnected by an interconnecting member 1270. The input shaft 17 is continuously connected with the planet carrier assembly member 1226 and selectively connectible with the sun gear member 1242 through the torque-transmitting mechanism 1250. The output shaft 19 is continuously connected with the ring gear member 1224 and selectively connectible with the planet carrier assembly member 1236 through the torque-transmitting mechanism 1252. The ring gear member 1244 is continuously connected with the transmission housing 60. The planet carrier assembly member 1246 is selectively connectible with the planet carrier assembly member 1236 through the torque-transmitting mechanism 1256 and selectively connectible with the ring gear member 1234 through the torque-transmitting mechanism 1254. The ring gear member 1234 is selectively connectible with the transmission housing 60 through the torque-transmitting mechanism 1258.

The truth table and chart shown in FIG. 26 provide a description of the engagement sequence and combinations for the torque-transmitting mechanisms to establish six forward speed ratios and one reverse speed ratio between the input shaft 17 and the output shaft 19 through the planetary gear arrangement 1218. The truth table also provides an example of numerical values for these speed ratios, which are determined, utilizing the ring gear/sun gear tooth ratios of the planetary gearsets 1220, and 1230, and 1240 when the ring gear/sun gear tooth ratios represented by R1/S1, R2/S2, and R3/S3, respectively, are utilized. The chart of the FIG. 26 describes the ratio steps between adjacent forward speed ratios and the reverse-to-first speed ratio when the numerical values given in the truth table are utilized.

Those skilled in the art will recognize that the numerical value for the reverse speed ratio is determined utilizing the ring gear/sun gear tooth ratio of the planetary gearset 1240. The first forward speed ratio has a numerical value determined utilizing the ring gear/sun gear tooth ratios of all three planetary gearsets 1220, 1230, and 1240. The numerical value for the second forward speed ratio is determined utilizing the ring gear/sun gear tooth ratios of the planetary gearsets 1220 and 1230. The third forward speed ratio is a direct drive having a numerical value of one. The fourth forward speed ratio has a numerical value determined utilizing the ring gear/sun gear tooth ratio of the planetary gearset 1220. The fifth forward speed ratio has a numerical value determined utilizing the ring gear/sun gear tooth ratios of the planetary gearsets 1220 and 1240. The sixth forward speed ratio has a numerical value determined utilizing the ring gear/sun gear tooth ratios of all three planetary gearsets 1220, 1230, and 1240.

The planetary gear sets have a number of members that are non-continuously interconnected (other than meshing relationships and the torque transmitting mechanisms) with other components of the respective planetary gear arrangements other than the appropriate selectively engageable torque transmitting mechanisms. The non-continuously interconnected members are selectively interconnected with other planetary members or with the input shaft 17, the output shaft 19 or the housing 60. For Example, in FIG. 1, the sun gear member 22, the sun gear member 32, the planet carrier assembly member 36, the sun gear member 42, and the ring gear member 44 are non-continuously interconnected members. In FIG. 11, the planet carrier assembly member 526, the planet carrier assembly member 536, the planet carrier assembly member 546, and the ring gear member 544 are non-continuously interconnected members. In FIG. 19, the ring gear member 924, the planet carrier assembly member 936, the planet carrier assembly member 946, and the ring gear member 944 are each non-continuously interconnected members. The family member depicted in FIG. 25 does not have a non-continuously interconnected member in the planetary gear set 1220, however, the planetary gear sets 1230 and 1240 each have two non-continuously interconnected members (ring gear member 1234, planet carrier assembly member 1236, planet carrier assembly member 1246, and sun gear member 1242). Those skilled in the art will readily recognize the non-continuously interconnected members in the other planetary gear arrangements.

What is claimed is:

1. A family of transmissions having a plurality of family members comprising:

an input shaft;

an output shaft;

a transmission housing;

a planetary gear arrangement comprising a first planetary gearset having a first member, a second member, and a third member, a second planetary gearset having a first member, a second member, and a third member, a third planetary gearset having a first member, a second member, and a third member, five selectively engageable torque transmitting mechanisms, and an interconnecting member continuously interconnecting said first member of said first planetary gearset with said first member of said second planetary gearset, said first member of said third planetary gearset being continuously interconnected with said transmission housing, said input shaft being continuously interconnected with one of said members of one of said planetary gearsets, and said output shaft being continuously interconnected with another of said members of one of said planetary gearsets;

a first of said torque transmitting mechanisms being selectively engageable to interconnect one of said members of said first planetary gearset with one of a group consisting of said input shaft, said output shaft, a member of said second planetary gearset, and a member of said third planetary gearset;

a second of said torque transmitting mechanisms being selectively engageable to interconnect one of said members of said second planetary gearset with one of a group consisting of said input shaft, said output shaft, a member of said first planetary gearset, and a member of said third planetary gearset;

a third of said torque transmitting mechanisms being selectively engageable to interconnect one member of said third planetary gearset with one of a group consisting of said input shaft, said output shaft, a member of said first planetary gearset, a member of said second planetary gearset, and said interconnecting member;

a fourth of said torque transmitting mechanisms being selectively engageable to interconnect one of a group consisting of one member of one of said planetary gearsets with one of a group consisting of said interconnecting member, and another member of one of said planetary gearsets;

a fifth of said torque transmitting mechanisms being selectively engageable to interconnect one of a group consisting of one member of one of said planetary gearsets with one of a group consisting of another member of one of said planetary gearsets and said transmission housing; and said five torque transmitting mechanisms being selectively engaged in combinations of three to establish at least six forward speed ratios and one reverse speed ratio between said input shaft and said output shaft.

2. The family of transmissions defined in claim 1 further wherein:

each of said members of said planetary gearsets being one of a group consisting of a sun gear member, a ring gear member, and a planet carrier assembly member.

3. The family of transmissions defined in claim 2 further wherein each of said planet carrier assembly members being comprised of one of a group consisting of a plurality of single pinion gears meshing with both a sun gear member and a ring gear member, and a plurality of intermeshing pinion gear pairs meshing with a sun gear member and a ring gear member respectively.

4. A family of transmissions having a plurality of family members comprising:

an input shaft;

an output shaft;

a transmission housing;

a first planetary gearset having first, second, and third members, a second planetary gearset having first, second, and third members, and a third planetary gearset having first, second, and third members;

an interconnecting member continuously interconnecting said first members of said first and second planetary gearsets, said first member of said third planetary gearset being continuously interconnected with said transmission housing, said input shaft being continuously interconnected with one of a group consisting of said interconnecting member, said second member of said first planetary gearset, and said second member of said second planetary gearset, said output shaft being continuously interconnected with one of a group consisting of said interconnecting member, said second member of said first planetary gearset, said third member of said first planetary gearset, and said second member of said second planetary gearset;

a first selectively engageable torque transmitting mechanism selectively interconnecting one of a group consisting of said input shaft and said output shaft with one of a group consisting of said second members of said second and third planetary gearsets, and said third members of said first, second, and third planetary gearsets;

a second selectively engageable torque transmitting mechanism selectively interconnecting one of a group consisting of said interconnecting member, said output shaft, and said third member of said first planetary gearset with one of a group consisting of said second members of said second and third planetary gearsets and said third members of said second and third planetary gearsets;

a third selectively engageable torque transmitting mechanism selectively interconnecting one of a group consisting of said output shaft, said third members of said first and second planetary gearsets, and said second member of said second planetary gearset with one of a group consisting of said interconnecting member, said third member of said second and third planetary gearsets, and said second member of said second and third planetary gearsets;

a fourth selectively engageable torque transmitting mechanism selectively interconnecting one of a group consisting of said second member of said first planetary gearset and said third member of said second planetary gearset with one of a group consisting of said second member of said third planetary gearset and said third member of said third planetary gearset;

a fifth selectively engageable torque transmitting mechanism selectively interconnecting one of a group consisting of said second member of said second planetary gearset, said third member of said second planetary gearset, said second member of said third planetary gearset, and said transmission housing with one of a group consisting of said third member of said first planetary gearset, said third member of said second planetary gearset, said second member of said third planetary gearset, and said third member of said third planetary gearset; and said five torque transmitting mechanisms being selectively engaged in combinations of three to establish at least six forward speed ratios and one reverse speed ratio between said input shaft and said output shaft.

5. A family of transmissions having a plurality of family members comprising:

an input shaft;

an output shaft;

a transmission housing;

a first planetary gearset having first, second, and third members, a second planetary gearset having first, second, and third members, and a third planetary gearset having first, second, and third members;

an interconnecting member continuously interconnecting said first members of said first and second planetary gearsets, said first member of said third planetary gearset being continuously interconnected with said transmission housing, said input shaft being continuously interconnected with one of a group consisting of said interconnecting member, said second member of said first planetary gearset, and said second member of said second planetary gearset, said output shaft being continuously interconnected with one of a group consisting of said interconnecting member, said second member of said first planetary gearset, said third member of said first planetary gearset, and said second member of said second planetary gearset, said planetary gearsets having at least four non-continuously interconnected members defined in a group consisting of said second member of said third planetary gearset, said third member of said third planetary gearset, said second member of said second planetary gearset, said third member of said second planetary gearset, and said third member of said first planetary gearset;

a first torque transmitting mechanism selectively interconnecting one of said input shaft and said output shaft with one of said non-continuously interconnected members;

a second torque transmitting mechanism selectively interconnecting one of a group consisting of said interconnecting member, said output shaft, and said non-continuously interconnected members with one of said non-continuously interconnected members;

a third torque transmitting mechanism selectively interconnecting one of a group consisting of said output shaft and said non-continuously interconnected member with one of said non-continuously interconnected members;

a fourth torque transmitting mechanism selectively interconnecting two of said non-continuously interconnected members;

a fifth torque transmitting mechanism selectively interconnecting one of a group consisting of said transmission housing and said non-continuously interconnected member with one of said non-continuously interconnected members; and said torque transmitting mechanisms being engaged in combinations of three to establish at least six forward ratios and one reverse ratio between said input shaft and said output shaft.

* * * * *